(12) United States Patent
Rajendran et al.

(10) Patent No.: US 12,717,697 B2
(45) Date of Patent: Aug. 25, 2026

(54) WIRELESS NETWORK INFRASTRUCTURE SOFTWARE PACKAGE VALIDATION

(71) Applicant: DISH Wireless L.L.C., Englewood, CO (US)

(72) Inventors: Karupaiah Rajendran, Sachse, TX (US); Omar Amaya-Gonzalez, Littleton, CO (US); Oscar Leonardo Rodriguez Gomez, Littleton, CO (US); David Ricardo Bentolila Sapiani, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 349 days.

(21) Appl. No.: 18/496,705

(22) Filed: Oct. 27, 2023

(65) Prior Publication Data

US 2025/0138982 A1 May 1, 2025

(51) Int. Cl.
*G06F 11/3604* (2025.01)
*G06F 8/65* (2018.01)

(52) U.S. Cl.
CPC ............ *G06F 11/3612* (2013.01); *G06F 8/65* (2013.01)

(58) Field of Classification Search
CPC ................................ G06F 11/3612; G06F 8/65
See application file for complete search history.

(56) References Cited

U.S. PATENT DOCUMENTS 10,613,970 B1 4/2020 Jammula et al.
2003/0226138 A1 12/2003 Luu
2012/0054299 A1 3/2012 Buck et al.
2017/0322794 A1 11/2017 Ferlitsch et al.
(Continued)

FOREIGN PATENT DOCUMENTS

CN 109462523 A 3/2019

OTHER PUBLICATIONS

Rodolfo Alvizu; Comprehensive Survey on T-SDN: Software-Defined Networking for Transport Networks; IEEE; pp. 2232-2283; retrieved on Feb. 17, 2026 (Year: 2025).
(Continued)

*Primary Examiner* — Myron Wyche
(74) *Attorney, Agent, or Firm* — Seed Intellectual Property Law Group LLP

(57) ABSTRACT

Techniques for wireless network infrastructure software package validation are provided. A NodeB includes a network entity that is a central unit, a distributed unit or a radio unit. A computer system receives data representing pre-installation performance indicators determined when the network entity is operated using a first software package and data representing post-installation performance indicators determined when the network entity is operated using a second software package. For a performance indicator type, the computer system compares post-installation and pre-installation performance indicators to determine a comparison result of a plurality of comparison results, determines whether to validate the second software package based on the comparison results and in response to determining to validate the second software package, sends a signal to the NodeB indicating that the second software package is validated. The NodeB causes the second software package to be installed on the network entity.

20 Claims, 10 Drawing Sheets

(56) References Cited

U.S. PATENT DOCUMENTS

| | | | | |
|---|---|---|---|---|
| 2020/0125349 | A1 | 4/2020 | Jayaraman et al. | |
| 2020/0257612 | A1 | 8/2020 | Lang et al. | |
| 2020/0403855 | A1 | 12/2020 | Sarood et al. | |
| 2022/0138081 | A1* | 5/2022 | Varma | G06F 11/3684 717/124 |

OTHER PUBLICATIONS

Antonis Alexiou; Performance Evaluation of TCP over UMTS Transport Channels; Telematics; 8 pages; retrieved on Feb. 17, 2026 (Year: 2004).

* cited by examiner

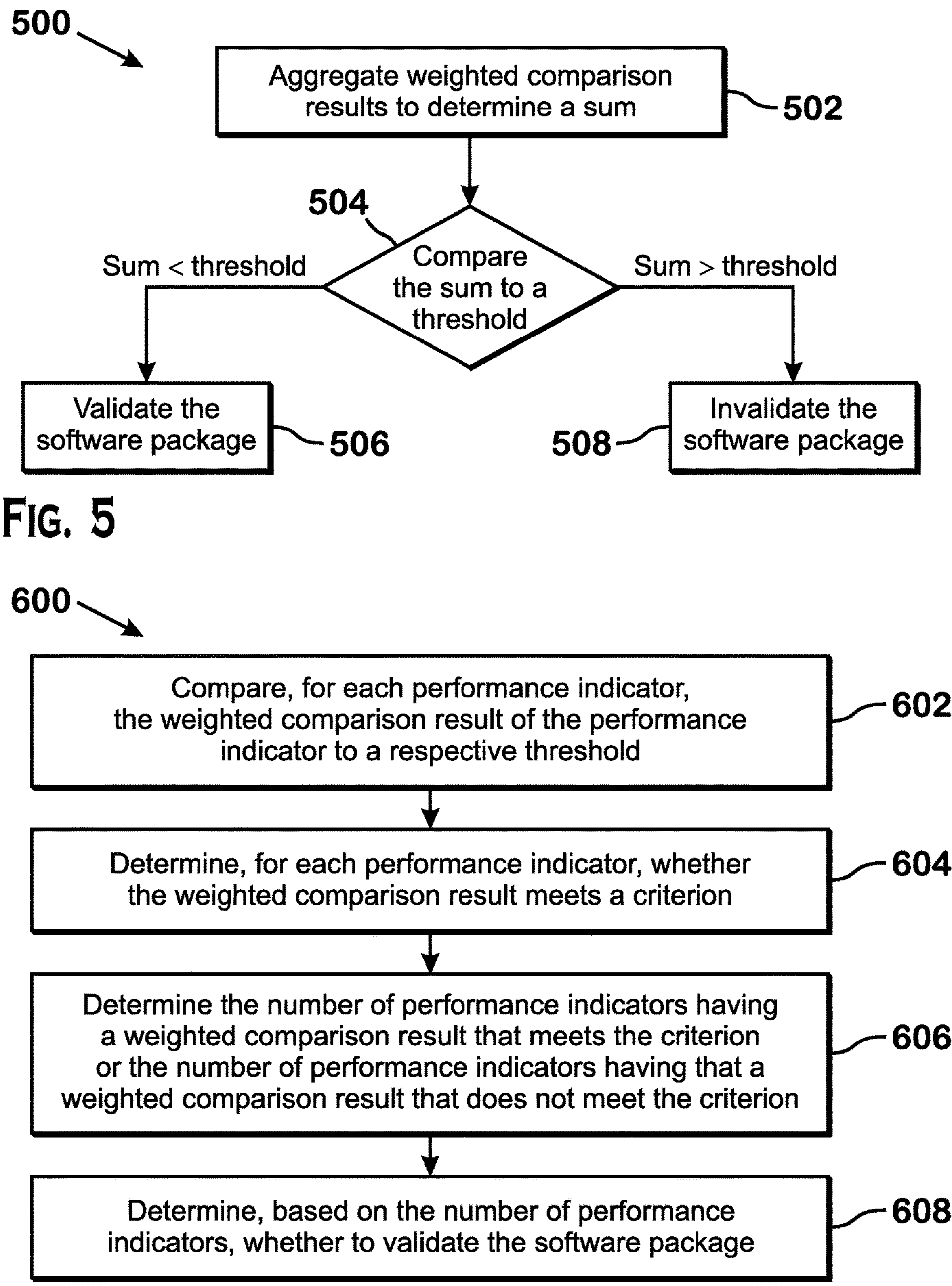
500
Aggregate weighted comparison results to determine a sum
502
504
Compare the sum to a threshold
Sum < threshold
Sum > threshold
Validate the software package
506
508
Invalidate the software package
FIG. 5
600
Compare, for each performance indicator, the weighted comparison result of the performance indicator to a respective threshold
602
Determine, for each performance indicator, whether the weighted comparison result meets a criterion
604
Determine the number of performance indicators having a weighted comparison result that meets the criterion or the number of performance indicators having that a weighted comparison result that does not meet the criterion
606
Determine, based on the number of performance indicators, whether to validate the software package
608
FIG. 6

WIRELESS NETWORK INFRASTRUCTURE SOFTWARE PACKAGE VALIDATION

BACKGROUND

Infrastructure-side entities in a wireless network are software-operated and utilize software that is frequency updated to add features or functionalities, remove features or functionalities, fix bugs or a combination thereof. The software upgrades may be provided by a network infrastructure vendor to an operator of the wireless network. For example, the vendor may provide both the infrastructure equipment and software updates for the equipment. However, due to interoperability or bugs in a software package update, the utilization of a new software package may result in a performance degradation in a wireless network.

BRIEF SUMMARY

In wireless communications networks, the infrastructure includes multiple entities that enable providing coverage to user devices (or user equipment (UEs)). For example, a base station (or NodeB or gNodeB) includes a central unit, a distributed unit and radio units that collectively operate to provide coverage (e.g., voice and data services) to subscribers. Typically, operators of wireless networks use equipment supplied by third-party vendors. For example, the routers and servers of the distributed unit may be purchased from a third-party vendor that supplies both the hardware and software to the network operator, which in turn operates the network to provide wireless coverage to subscribers. Vendors also supply software packages and updates to the software packages that are deployed from time to time. Due to the complexity of the infrastructure-side of the wireless network, an operator uses infrastructure equipment (and installs corresponding software updates) from a variety of vendors.

A software package update may be made to rectify software bugs, improve software package stability, or add new features or functionalities, among others. However, updating the software package may in and of itself degrade network performance. For example, the updated software package may not interoperate with other equipment in the network as well as the previous software package or the updated software package may not be compatible with the existing implementation.

Described herein are techniques for validating a software package. The software package is installed on a network entity and the network is operated with the software package. Thereafter, performance indicators of the network are logged. The performance indicators may be metrics that are measured by the user equipment or the NodeB as specified by a communication protocol of the network. The performance indicators are evaluated to determine whether the network coverage and performance has deteriorated with the use of the software package as to warrant invalidating the package (and instead reverting a previous software package that was in use) or the coverage and performance is within an acceptable range as to warrant validating the package (and deploying the software package for use).

BRIEF DESCRIPTION OF THE DRAWINGS

FIG. 5 shows a flow diagram of a method for validating a software package based on performance indicators.

FIG. 6 shows a flow diagram of a method for validating a software package based on performance indicators.

DETAILED DESCRIPTION

Figure 1:
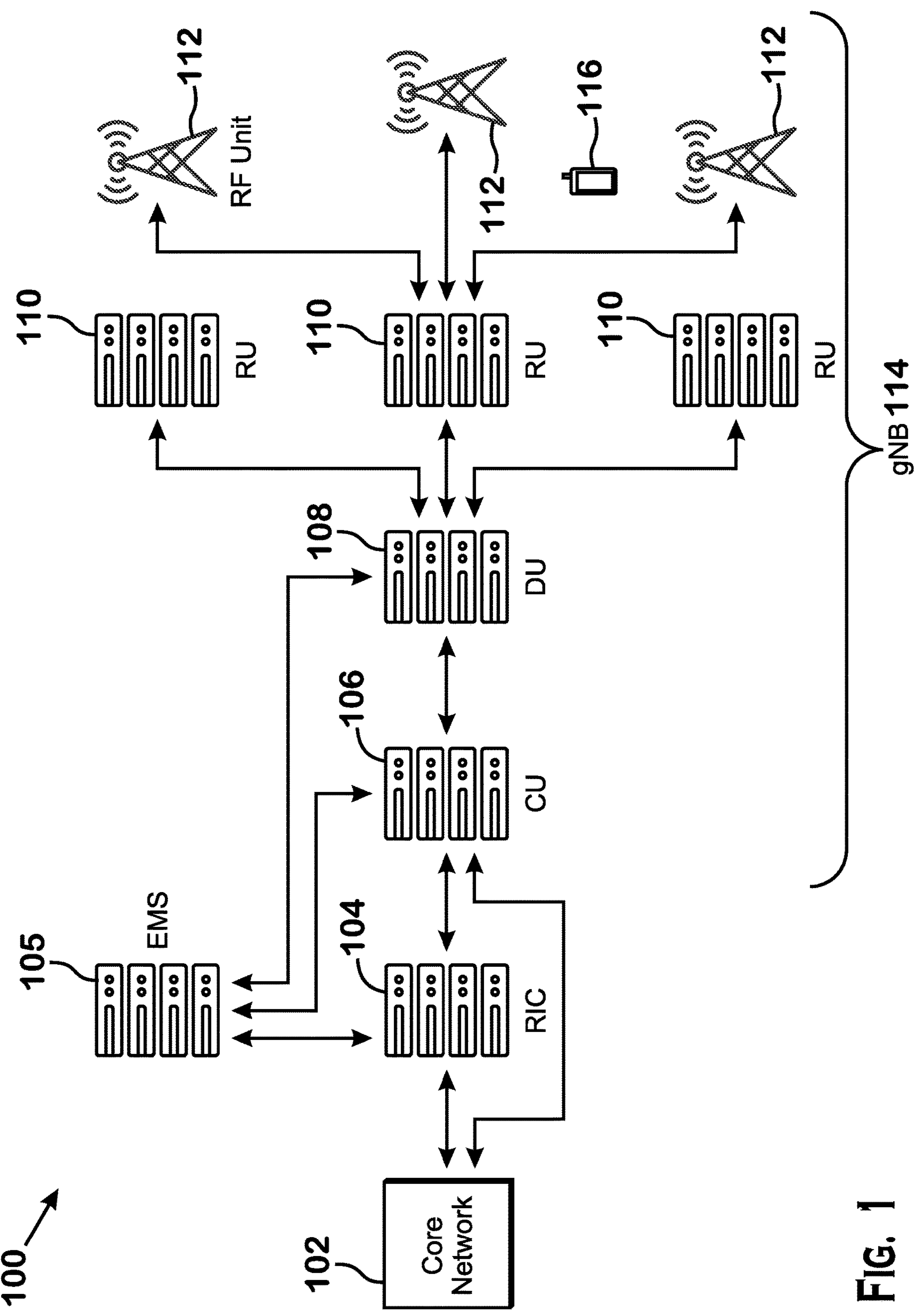
FIG. 1 shows an example of a wireless network system.

FIG. 1 shows an example of a wireless network system 100. The wireless network system 100 may, for example, be an open radio access network (O-RAN). The wireless network system 100 includes a core network 102, a radio access network (RAN) intelligent controller (RIC) 104, an element management system (EMS) 105, a central unit 106, a distributed unit 108, a plurality of radio units 110 and a plurality of radio frequency (RF) units 112. The central unit 106, distributed unit 108, radio units 110 and RF units 112 collectively make up a next generation NodeB (gNB) 114. The gNB may be a base station. Also shown in FIG. 1 is a user equipment (UE) 116, which may communicate with the gNB 114 over the RF unit 112. Although one user equipment 116 is shown in FIG. 1, it is noted that the gNB 114 may serve multiple user equipment by sending downlink data to the user equipment and receiving uplink data from the user equipment.

An RF unit 112 may be a cellular tower. The RF unit 112 may include one or more antennas configured to wirelessly communicate with the user equipment 116. For example, the RF unit 112 may include one or more antenna arrays. Each array may include multiple antennas arranged linearly. Further, the array may be a planar array and may include multiple antennas arranged in two-dimensional (2D) space. The RF unit 112 may transmit radio waves (RF signals) to the user equipment 116 to send downlink data to the user equipment 116. The RF unit 112 may receive radio waves transmitted by the user equipment 116 and may, accordingly, receive uplink data from the user equipment 116.

The radio unit 110 may include a server, a baseband processor, a digital front-end and an analog front-end. The analog front-end may interface with the RF units 112. The analog front-end may receive intermediate frequency (IF) signals representative of the RF signals from the RF unit 112. The analog front-end may also send intermediate frequency signals to the RF unit 112 for transmission as RF signals. The baseband processor may process the intermediate frequency signals received from the RF unit 112 and generate digital baseband signals therefrom. The baseband processor may process the intermediate frequency signals received from the RF unit 112 and generate digital baseband signals therefrom, and the baseband processor may process digital baseband signals received from the distributed unit 108 and generate intermediate frequency signals therefrom.

The server or the baseband processor of the radio unit 110 may perform lower physical layer (PHY) processing on the digital signals received from the distributed unit 108. The distributed unit 108 may be coupled to the RF unit 112 by an intervening cell site router. The processing may include applying a fast Fourier transform (FFT) to the digital signals, performing precoding on the digital signals, modulating the digital signals, performing beamforming on the digital signals or a combination thereof. The server or the baseband processor of the radio unit 110 may perform lower PHY processing on the intermediate frequency signals received from the RF unit 112. The processing may include applying an inverse fast Fourier transform (IFFT) to the intermediate frequency signals, performing precoding on the intermediate frequency signals, demodulating the intermediate frequency signals, performing beamforming processing on the intermediate frequency signals or a combination thereof.

A connection between the radio unit 110 and the distributed unit 108 is referred to as the fronthaul. The distributed unit 108 outputs the digital signals to the radio unit 110 over the fronthaul. The distributed unit 108 may include a server configured to perform higher PHY processing on the digital signals. The distributed unit 108 may perform resource element mapping, layer mapping scrambling, precoding, modulation, encoding or a combination thereof on the digital signals. The distributed unit 108 then outputs the digital signals having performed higher PHY processing on the digital signals.

A connection between the distributed unit 108 and the central unit 106 is referred to as the midhaul. The distributed unit 108 outputs the digital signals to the radio unit 110 over the fronthaul. The distributed unit 108 may include a server configured to perform higher PHY processing on the digital signals. The distributed unit 108 may perform resource element mapping, layer mapping, scrambling, precoding, modulation, encoding or a combination thereof on the digital signals. The distributed unit 108 then outputs, to the radio unit 110, the digital signals having performed higher PHY processing on the digital signals.

The central unit 106 may include a server configured to control the operations of the distributed unit 108 over the midhaul. The central unit 106 performs Radio Resource Control (RRC) protocol connection establishment, connection release, broadcast of system information, radio bearer establishment, radio bearer reconfiguration, radio bearer release, connection mobility procedures, paging notification or a combination thereof.

In the gNB 114, the central unit 106 may serve and may be connected to multiple distributed units 108. Further, as shown in FIG. 1, each distributed unit 108 serves multiple radio units 110, whereby each radio unit 110 serves multiple RF units 112. The central unit 106 and the distributed unit 108 may each be virtual servers that are hosted and virtualized using underlying computing resources (such as physical servers, routers and memory for data storage, among others). The underlying computing resources may be located in the same data center or different data centers.

The central unit 106 has a backhaul connection to the RAN intelligent controller 104. The RAN intelligent controller 104 may be a server configured to control and optimize the functions of the wireless system 100. The RAN intelligent controller 104 may perform load balancing to mitigate network congestion. The RAN intelligent controller 104 may also deploy new services. The RAN intelligent controller 104 may perform data processing and apply artificial intelligence (AI) or machine learning (ML) models to data trafficked over the system 100. The RAN intelligent controller 104 may perform real-time automation and enable proactive network resource management and service differentiation.

The RAN intelligent controller 104 may perform a self-organizing network (SON) function. According to the SON function, the RAN intelligent controller 104 may receive information from the element management system 105 on the operation of the system 100 or gNB 114. The RAN intelligent controller 104 may evaluate the information and change operating parameters (for example, resource utilization) of the system 100 or gNB 114 to perform load balancing or optimize the operation of the network.

The element management system 105 is connected to the central unit 106, the distributed unit 108 and the RAN intelligent controller 104. The element management system 105 may include a server configured to manage the central unit 106 and the distributed unit 108 and disaggregate the central unit 106 and the distributed unit 108 into the respective services and control plane and user plane functions that the central unit 106 and the distributed unit 108 respectively provide. The element management system 105 may monitor the functions performed by the central unit 106 and the distributed unit 108.

The element management system 105 may receive data from the central unit 106, the distributed unit 108 and the RAN intelligent controller 104. The data may indicate a fault, a configuration or a performance of the central unit 106, the distributed unit 108 or the RAN intelligent controller 104. The element management system 105 may optimize the traffic and service of the central unit 106, the distributed unit 108 and the RAN intelligent controller 104 based on the data. The element management system 105 may also evaluate the data to enhance the performance and radio resource management of the central unit 106, the distributed unit 108 and the RAN intelligent controller 104. The element management system 105 may be a virtual server that is hosted and virtualized using underlying computing resources (such as physical servers, routers and memory for data storage, among others). The underlying computing resources may be located in the same data center or different data centers.

The RAN intelligent controller 104 and the central unit 106 are connected to the core network 102. The core network 102 may include one or more computer systems, which may be distributed computer systems. The core network 102 provides access control including user or user equipment 116 authentication for a requested service. The core network 102 also performs routing including voice call and data routing. For example, the core network 102 may route a voice call to a public switched telephone network. The core network 102 may route data from the RAN intelligent controller 104 and the gNB 114 to RAN intelligent controllers and gNBs of other systems.

The RF unit 112 may provide cellular coverage in one or more cells. A cell may be a geographic area in which the RF unit 112 transmits downlink data to the user equipment 116 and receives uplink data from the user equipment 116. For example, the cell may be a sector in which the RF unit 112 provides cellular coverage. The RF unit 112 may use one or more carriers to provide the coverage. For example, the RF unit 112 may use a primary carrier and a secondary carrier. The carrier over which the RF unit 112 provides cellular coverage may be a cell. The carrier may be a communication frequency or a frequency band. The cell may be the carrier or a frequency band thereof.

A server of a network entity, such as the radio unit 110, the distributed unit 108, the central unit 106 or the gNB 114, is operated using a respective software package. The network entity may be a part (or a component) of the gNB 114, and the network entity may be tasked with performing a portion of the operations for providing the wireless coverage-provisioning functionality of the gNB 114. The portion of the operations may be delegated to the network entity. A software package for the server (of the radio unit 110, distributed unit 108, central unit 106 or any other network entity) may be program instructions and may be stored on memory (a data storage device) of the server. The program instructions may be executed by a processor of the server and may, accordingly, cause the server to perform various tasks assigned to the network entity in the network 100. The software package may include an operating system (OS), applications, virtualization software, security software or a combination thereof. The software package may include algorithms for operating a network entity. The software package may be developed by network equipment vendors or network solutions vendors and may be used by service providers on their respective networks. After the software package is installed on the network entity, the network entity may be operated using the software package. Operating the network entity using the software package may include causing the network entity to provide communication functionality in the network as specified by the software package. For example, a software package that is installed on the central unit may include routines and algorithms that specify how the central unit is to perform RRC protocol connection establishment and connection release. The central unit may be operated using the software package, whereby the central unit follows the RRC protocol connection establishment and connection release as specified by the routines and algorithms.

For example, the software package of the distributed unit 108 may enable the distributed unit 108 to perform radio signal processing, protocol stack implementation, radio resource allocation or a combination thereof. The software package of the distributed unit 108 may be integrated with and may interoperate with the software packages of other network entities, such as the radio unit 110 and the central unit 106, to provide end-to-end connectivity for the user equipment 116. The software package of the distributed unit 108 may include program instructions that, when executed by a processor of the distributed unit 108, cause the distributed unit 108 to perform modulation/demodulation, encoding/decoding, radio resource management, spectrum allocation, scheduling, power control, protocol stack handling, mobility management (including handover), measurement reporting or a combination thereof.

An operator (such as a cellular service provider) of the network 100 may update the software package of a network entity. Updating the software package may include uninstalling an existing software package and adding and installing a new software package. The software package of the network entity may be updated to address and rectify software bugs and improve software package stability. The software package of the network entity may be updated to improve compatibility and interoperability between network entities, add new features or functionalities (e.g., that implement wireless technology advancement), enhance security measures and features (e.g., patches or encryption improvements) or a combination thereof.

However, updating the software package of the network entity may result in degrading the performance of the network 100. For example, updating the software package may reduce the interoperability and compatibility between the network entity and other network entities or cause, lead to software crashes or functionality losses in the network entity, introduce new bugs in the network entity, cause system instability, cause operational disruption and result in losing configurations and customizations of the network entity, increase resource consumption, degrade system efficiency or a combination thereof. Techniques are described herein for validating the software package. Validation of the software package may be performed to determine whether the software package is approved for use or not.

The software package may be validated by evaluating various performance indicators of a communication link between the gNB and the user equipment pre- and post-installation of the software package. A performance indicator of the system 100 may be a performance measure of the network entity upon which the software package is installed. The performance indicators may be performance metrics or parameters. A performance indicator may have a particular type. Baseline performance indicators may be obtained before installation of the software package (e.g., using an existing software package that is also referred to as a first software package herein). Post-installation performance indicators may be obtained using the newly installed software package (referred to as a second software package herein), and the baseline performance indicators may be compared to the post-installation performance indicators of the same type to determine whether to validate the software package.

The performance indicator may be specified by a communication protocol used by the system. For example, the Fifth Generation (5G) New Radio (NR) protocol specifies standardized techniques for obtaining and reporting various performance indicator types of a communication link between the NodeB and user equipment including the uplink received signal strength indicator (UL RSSI), channel quality indicator (CQI), rank indicator (RI), and modulation and coding scheme (MCS), among others. A network entity or the UE may obtain of the communication link and report a performance indicator during operation to determine a throughput or communication reliability of the network. One or more performance indicators may be used to adjust allocated time or frequency resources or power control, among others. The same performance indicators that are standardized by the communication protocol may be logged (during a testing phase) and used to determine whether to validate a software package as described herein.

Figure 2:
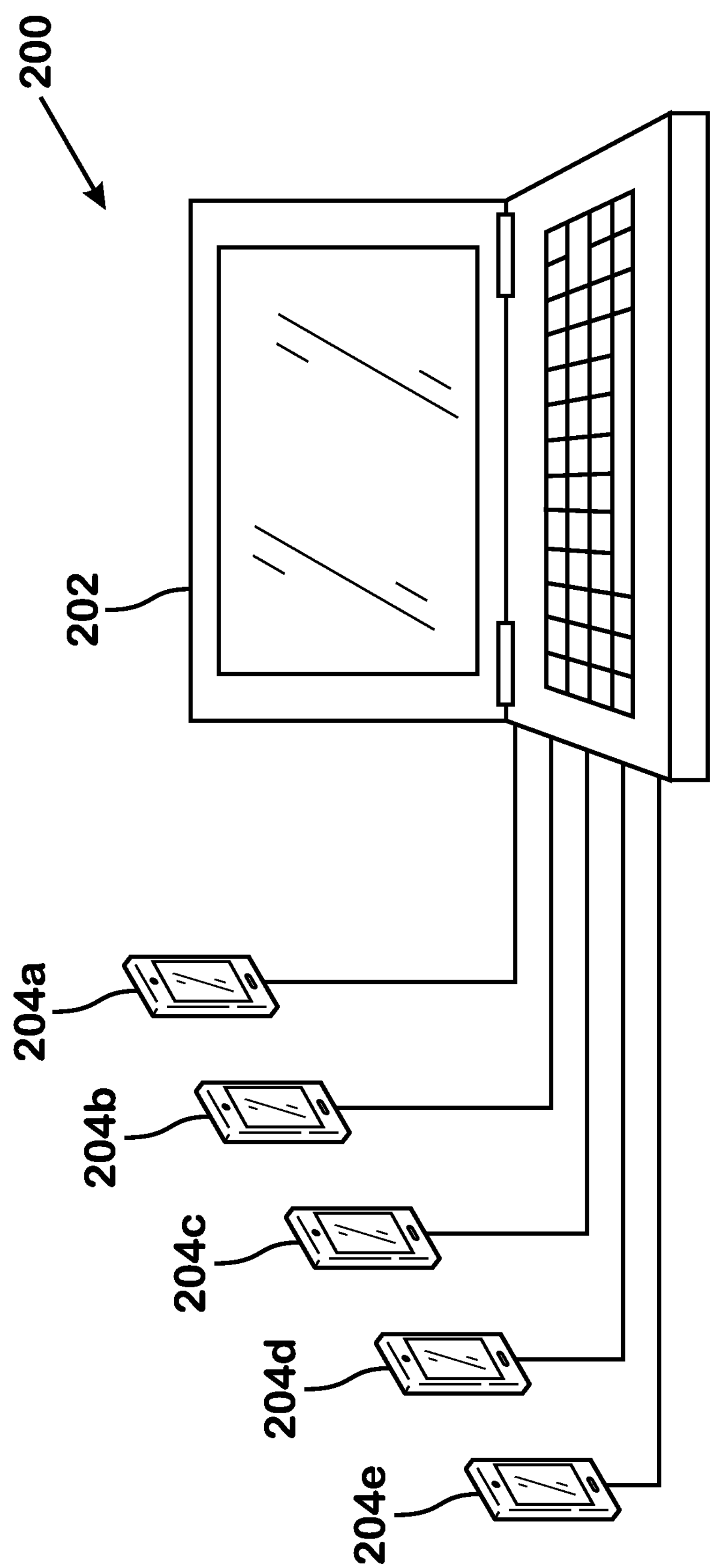
FIG. 2 shows an example of a drive testing system.

FIG. 2 shows an example of a drive testing system 200. The drive testing system 200 includes a computer system 202 and five UEs 204*a*-204*e*. Each UE 204*a-e* may be similarly configured as the UE 116 described herein. The UEs 204*a-e* are coupled to the computer system 202 wirelessly (e.g., using near-field communications (NFC), Bluetooth or Wi-Fi) or in a wired manner (e.g., using a universal serial bus (USB) connection). The computer system 202 receives data from the UEs 204*a-e* and records or logs the data. The data may be received from a respective communication chipset or processor (e.g., mobile platform or cellular modem) of the UEs 204*a-e*. The computer system 202 may receive the data in real-time as a drive test is being performed. The data may represent the performance indicator of the network 100 as the drive test is performed and as the UEs 204*a-e* move in a geographic area.

During the drive test, a first UE 204*a* may perform mobile origination. Mobile origination may be a connection establishment procedure for provisioning wireless connectivity for the UE. For example, mobile origination may include configuring the first UE 204*a* to operate in a radio resource control (RRC) Connected State. Data from the first UE 204*a* may be logged for evaluating the handling of the addition of devices to the network. A second UE 204*b* may perform mobile termination, and data from the second UE 204*b* may be logged for evaluating the handling of the removal or handover of devices. Mobile termination may be a connection termination procedure for ceasing to provide (or reducing the provision of) wireless connectivity for the UE. For example, mobile termination may include configuring the second UE 204*b* to operate in an Idle Mode. A third UE 204*c* may perform data download. Logged data of the third UE 204*c* may be used for evaluating the handling of various traffic volumes in the downlink in the network. A fourth UE 204*d* may perform data uplink. Logged data of the fourth UE 204*d* may be used for evaluating the handling of various traffic volumes in the uplink in the network. A fifth UE 204*e* may perform simultaneous uplink and downlink. Logged data of the fifth UE 204*e* may be used for evaluating the handling of various traffic volumes simultaneously in the uplink and downlink.

In a drive test, the drive testing system 200 may be moved in a geographic area. For example, the drive testing system 200 may be placed in a car and driven along a route. The drive testing system 200 logs data of the UEs 204*a-e* as the UEs 204*a-e* move within the geographic area. During the movement, the distance between the UEs 204*a-e* and the RF unit 112 change. Further, handovers are triggered between cells, RF units 112 or gNBs 114 of the network 100. The logged data reflects the response of the network (as viewed by the UEs 204*a-e*) to different mobility situations of the UEs 204*a-e*.

The computer system 202 of the drive testing system 200 may use the techniques described herein to determine whether to validate the software package. Alternatively, the logs of data representing the performance indicators may be transferred from the computer system 202 and stored in another computer system, and the other computer system may determine whether to validate the software package. The other computer system may be a computer system of a network entity, such as the gNG 114, EMS 105 or RIC. The other computer system may be a computer system of the core network 102.

Figure 3:
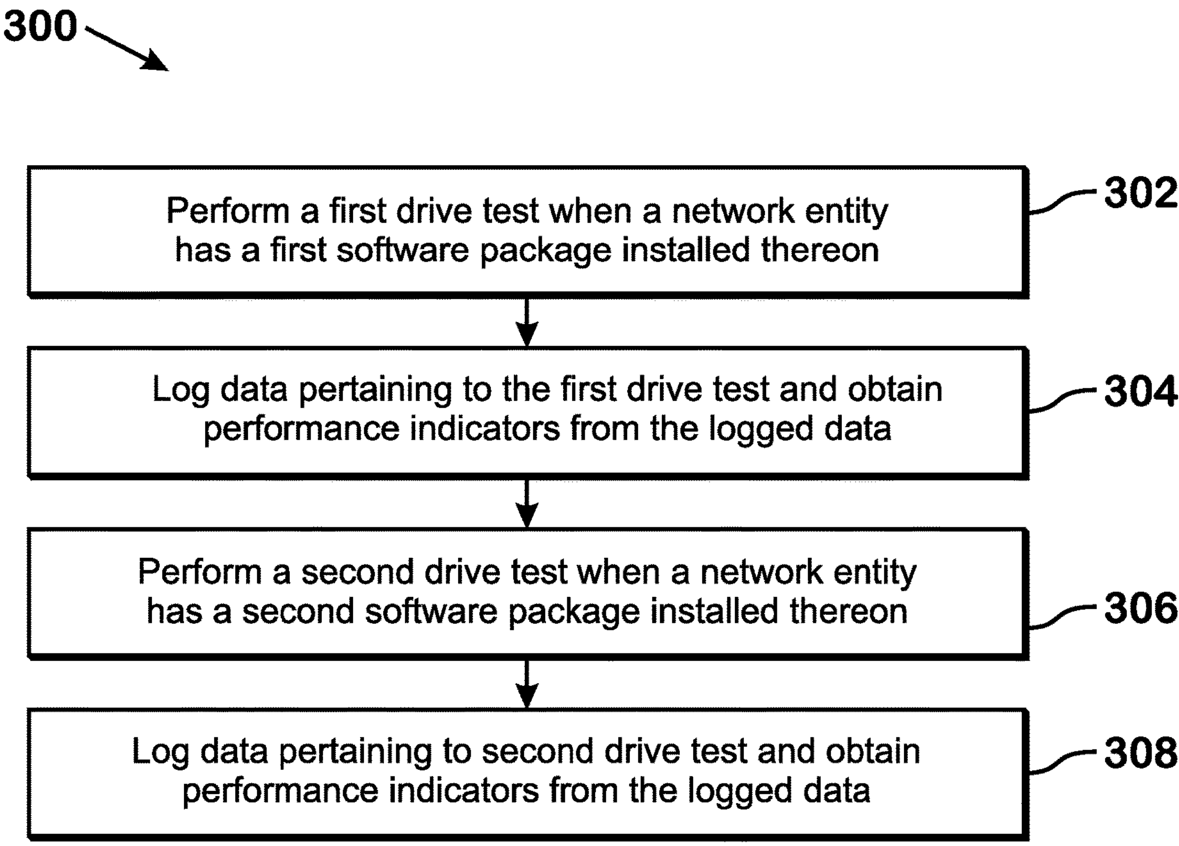
FIG. 3 shows a flow diagram of a method for validating a software package.

FIG. 3 shows a flow diagram of a method 300 for validating a software package. At 302, a first drive test is performed when a network entity has a first software package installed thereon. The first software package may be the baseline package. For example, the first software package may be a software package that had been in use in the network and an operator of the network deems reliable. At 304, the drive testing system 200 logs data pertaining to the first drive test and obtains performance indicators from the logged data. At 306, a second drive test is performed when a network entity has a second software package installed thereon. The second software package may be a new package (or upgrade) that is sought to be used in the network 100. At 308, the drive testing system 200 logs data pertaining to the second drive test and obtains performance indicators from the logged data. As a control measure, the first (pre-installation) and second (post-installation) drive tests may be performed using the same route, at the same time of the day, the same day of the week or a combination thereof.

Figure 4:
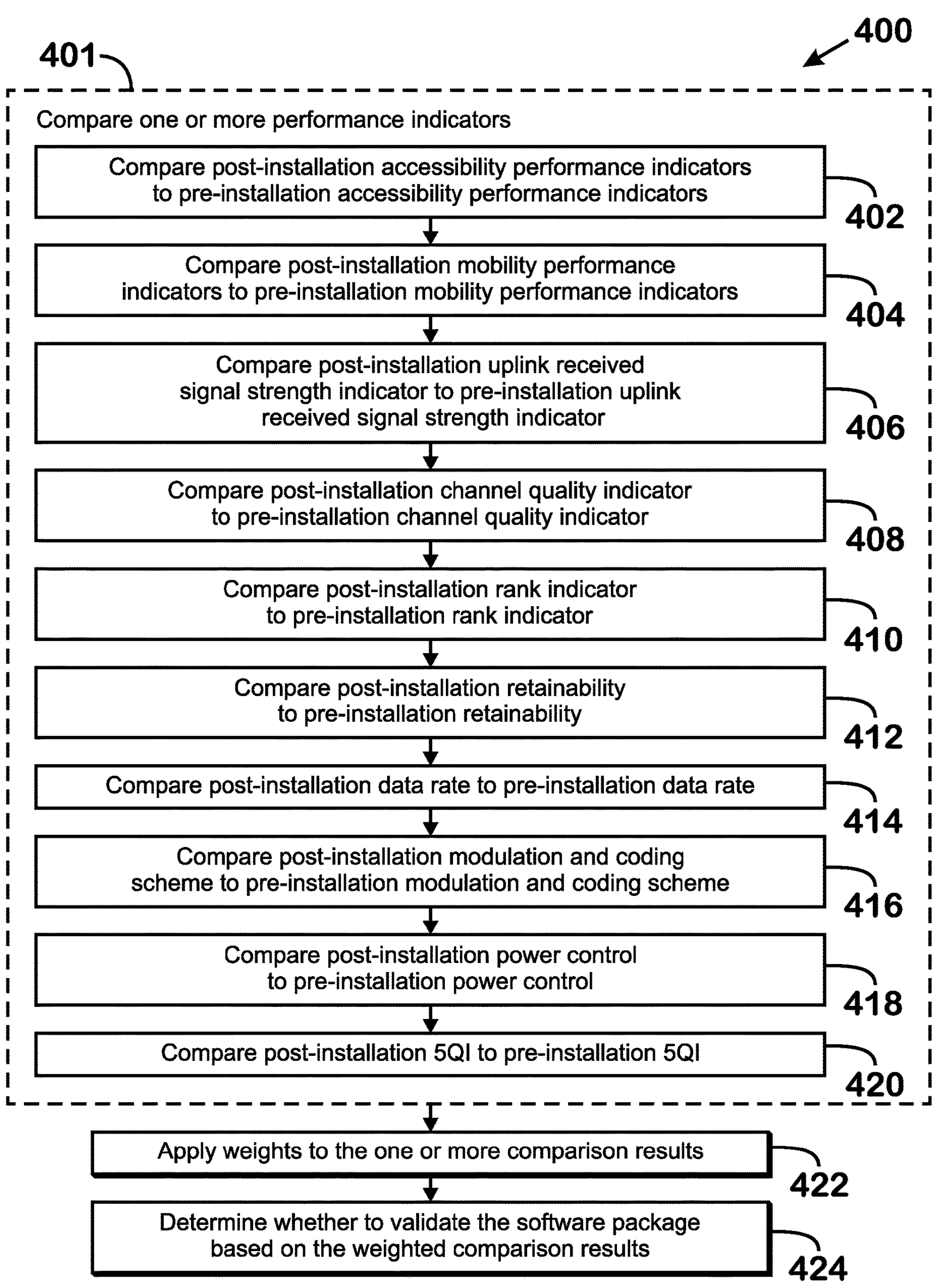
FIG. 4 shows a flow diagram of a method for validating a software package based on performance indicators.

FIG. 4 shows a flow diagram of a method 400 for validating a software package based on performance indicators. At 401, a computer system compares one or more performance indicators to determine whether to validate the software package. The computer system may be the computer system 202 of the drive testing system 200 or another computer system to which post- and pre-installation logs have been transferred. The computer system may select one or more performance indicator types to evaluate. As described here, the computer system may compare any number of types of pre- and post-installation performance indicators from a list of performance indicator types including accessibility performance indicators, mobility performance indicators, uplink received signal strength indicator, channel quality indicator, rank indicator, retainability, data rate, modulation and coding scheme, power control and 5QI. The computer system may select a set of performance indicators from the list. For example, the computer system may select the mobility performance indicator and uplink received signal strength indicator for evaluation and may not evaluate the remaining performance indicator types of the list. It is noted that performance indicator types that are not evaluated may not be compared as part of the method 400. Continuing with the example, the mobility performance indicator and uplink received signal strength indicator are compared at 404, 406 and the accessibility performance indicators and the rank indicator are not compared at 402, 410.

The computer system may select the one or more performance indicator types to evaluate based on an input of an operator of the network. For example, the operator may prioritize accessibility performance indicators, mobility performance indicators and the channel quality indicator. Accordingly, the operator may command the computer system to include at least the performance indicator types in the evaluation. Additionally or alternatively, the computer system may receive an indication of features affected by the second software package and may select the one or more performance indicator types based on the type of features that are updated by the second software package. The computer system may select performance indicator types that are most likely to be affected by the updates made in the second software package. For example, if the second software package alters antenna port configurations of the network, then the computer system may select the rank indicator due to the fact that an antenna port configuration change or error in making the antenna port configuration change may be reflected in the rank indicator. As described herein, the rank indicator reflects the number of independent data stream transmitted simultaneously on an antenna element.

At 402, the computer system compares a post-installation accessibility performance indicator to a pre-installation accessibility performance indicator. The computer system may determine the accessibility performance indicators (as well as other performance indicators described herein) from the log data. The accessibility performance indicator may be a measure of how well the network provides access for data to the UE 116. For example, the accessibility performance indicator may be a data rate (a control data rate or a non-control user data rate) of the drive test UEs 204*a-e*, a number of symbols allocated to the drive test UEs 204*a-e*, a number of symbols utilized by the drive test UEs 204*a-e*, an indication of whether power scaling (or power boosting) was performed by the drive test UEs 204*a-e* or a combination thereof.

It is noted that, as with other performance indicator types described herein, the accessibility performance indicators may be compared for any number of the drive test UEs 204*a-e* either individually or collectively. For example, one, two or all of the drive test UEs 204*a-e* may be selected and the indicators may be compared individually for the selected UEs 204*a-e*. Thus, each selected UE 204*a-e* may be associated with an accessibility performance indicator comparison that compares a post-installation accessibility performance indicator determined by the UE in the drive test to a pre-installation accessibility performance indicator determined by the UE in the drive test. For each selected UE 204*a-e*, more than one accessibility performance indicator may be compared. For example, the data rate, number of allocated symbols and number of utilized symbols may be compared for each selected UE 204_a-e_.

An accessibility performance indicator comparison may be aggregated for the selected UEs 204_a-e_ for collective evaluation. An aggregate accessibility performance indicator may be a sum, mean, median or more, among others, of the accessibility performance indicators reported by the selected UEs 204_a-e_. For each type of indicator (data rate, number of allocated symbols, number of utilized symbols, indication of whether power scaling is performed), the indicators of the selected UEs 204_a-e_ may be aggregated and compared. Accordingly, one comparison is made for each type of indicator.

In addition, some selected UEs 204_a-e_ may have their respective accessibility indicators compared individually, whereas other selected UEs 204_a-e_ may have their respective accessibility indicators compared collectively. The individual or collective comparison described herein with reference to the accessibility indicators may be performed for other indicators, parameters and configurations described herein.

The type of performance indicator may dictate or inform the selection of the UEs 204_a-e_. For example, given that accessibility performance indicators aim to gauge the network's ability to provide data access and connectivity to UEs, the selected UEs may be those that have higher data usages. Because the first and second UEs 204_a,b_ perform mobile origination and termination, respectively, the first and second UEs 204_a,b_ may not be selected for accessibility performance comparison. Instead, the third, fourth and fifth UEs 204_c-e_ may be selected as the UEs 204_c-e_ test the network's ability to provide uplink and downlink data accessibility.

As with other indicators, parameters and configurations described herein, comparing an accessibility performance indicator may include determining whether a criterion for the accessibility performance indicator is met. The fifth UE 204_e_ performs simultaneous uplink and downlink and the computer system logs the number of allocated symbols allocated to the UE in the drive tests. The fifth UE 204_e_ may be selected for individual number of allocated symbols comparison. A criterion for the comparison may be met if the number of allocated symbols decreases by more than five, and the criterion may not be met if the number of allocated symbols increases or decreases by five or less. The comparison, at 402, may yield a difference in the number of allocated symbols, a determination of whether the number of allocated symbols meets (or does not meet) the established criterion or both.

At 404, the computer system compares a post-installation mobility performance indicator to a pre-installation mobility performance indicator. A mobility performance indicator may be a number of times that handovers occurred (for example, as counted by a counter), a success rate of the handovers (e.g., a percentage of the time that handovers are successfully completed), the data rate of the UE during handover, a duration of time taken for each handover to complete or a combination thereof. A handover may be a cell handover (e.g., a transfer of the UE from one cell to another cell). A handover may be triggered due to the mobility of the UEs 204_a-e_ in the drive testing. More than one handover may be attempted or completed. The handover data rate may be an average of the data rates of a UE during the various handovers. The data rate of the UE during handover may be evaluated to determine whether the UE continues to obtain network service during handover or whether the handover degrades the UE's connectivity.

The duration of time of handover may be an average of the durations of time of UE handovers. The duration of time may be evaluated to determine whether handover is performed with speed or whether handover takes a longer duration of time and potentially degrades the UE's connectivity. As described herein, the mobility performance indicator may be compared individually or collectively for selected UEs 204_a-e_.

A mobility performance indicator may also be a random access channel (RACH) detection threshold. The RACH detection threshold may represent a RACH signal level to be achieved for successful completion (or negotiation) of a random access procedure. An increase in the RACH detection threshold signifies a worsening network condition due to the fact that the UE generates a RACH signal with more power post-installation than pre-installation in order to successfully complete a random access procedure. For example, the RACH detection threshold may increase from −3 dB to −1 dB, and the comparison outcome (or comparison result) of comparing the post-installation RACH detection threshold to the pre-installation RACH detection threshold may be 2 dB. Further, in the event that the mobility performance indicator is the RACH detection threshold, the criterion associated with the comparison result may be met if the RACH detection threshold increases more than 1 dB. Conversely, the criterion is not met when the difference between the post- and pre-installation RACH detection thresholds is 1 dB or less. Due to the fact that the RACH detection threshold changed by 2 dB, the criterion may be met.

At 406, the computer system compares a post-installation uplink received signal strength indicator (UL RSSI) to a pre-installation UL RSSI. The UL RSSI quantifies the strength of signals received by gNB 114 from the UE 116 on the uplink. The UL RSSI may be measured in decibels-milliwatts (dBm). As described herein, the UL RSSI may be compared individually or collectively for selected UEs 204_a-e_. The recorded log may include multiple UL RSSIs for each UE 204_a-e_ that are determined over the course of the drive test. One UL RSSI may be determined as a function of the multiple UL RSSIs. The function may be a mean, mode, minimum or maximum. Alternatively, one of the pre-installation multiple UL RSSIs may be randomly selected and one of the post-installation multiple UL RSSIs may be randomly selected, and the two UL RSSIs may be compared for determining whether to validate a software package. It is noted that the random selection of one indicator from multiple indicators and the determination of one indicator as a function of multiple indicators described herein with reference to the UL RSSI may be used in the comparison of any indicator, parameter or configuration described herein. As with other indicators, parameters or configurations, the comparing the UL RSSI may alternatively or additionally yield a determination of whether a criterion for the UL RSSI is met.

At 408, the computer system compares a post-installation channel quality indicator (CQI) to a pre-installation CQI. The CQI may be determined based on the signal strength, signal-to-noise ratio (SNR), signal-to-interference-and-noise ratio (SINR) or a combination thereof for communications between the UE and the network. The UE may determine the CQI and feed the CQI back to the network (e.g., using periodic or aperiodic reporting). As described herein, the CQI may be compared individually or collectively for selected UEs 204_a-e_. The recorded log may include multiple CQIs for each UE 204_a-e_ that are determined over the course of the drive tests. One CQI may be determined as a function of the multiple CQIs, where the function may be a mean, mode, minimum or maximum.

At 410, the computer system compares a post-installation rank indicator to a pre-installation rank indicator. The rank indicator, which may be an integer value, may indicate the number of spatial streams that a receiver (e.g., of the UE or gNB) effectively receives and decodes, where a spatial stream is an independent data stream transmitted simultaneously on an antenna element. The rank indicator may signify an ability of the receiver to exploit multiple-input, multiple-output (MIMO) spatial diversity. The threshold of the rank indicator criterion may be 0. The criterion for the rank indicator may be met if the rank indicator decreased by any number.

At 412, the computer system compares a post-installation retainability indicator to a pre-installation retainability indicator. The retainability indicator may indicate whether video or audio service for a UE was terminated or cut off mid-service. For example, if the retainability indicator for a UE has a value of 0, then that indicates that the UE did not experience a mid-service cut off or termination during the drive test. Conversely, if the retainability indicator for a UE has a value of 1, then that indicates that the UE did experience a mid-service cut off or termination during the drive test.

At 414, the computer system compares a post-installation data rate to a pre-installation data rate. The data rate may be a peak data rate or an average data rate for a UE during post-installation and pre-installation testing. Additionally or alternatively, the data rate may be a peak data rate or an average data rate for a transmission time interval (TTI) of the UE, which may be 1 millisecond (ms).

At 416, the computer system compares a post-installation modulation and coding scheme to a pre-installation modulation and coding scheme. The modulation and coding scheme may be used by a UE in the uplink or downlink. The modulation and coding scheme may range from quadrature phase shift keying (QPSK) to 256 quadrature amplitude modulation (256-QAM), whereby each different modulation type may be associated with an index. The computer system may average the indices of the modulation and coding schemes used by the UE in the pre-installation test to determine the pre-installation modulation, and the computer system may average the indices of the modulation and coding schemes used by the UE in the post-installation test to determine the post-installation modulation and coding scheme for use in the comparison. For example, each TTI may be assigned a modulation and coding scheme index and the computer system may average the indices of the TTIs.

At 418, the computer system compares post-installation power control to pre-installation power control. The power control may indicate whether a UE used closed loop power control during testing or not. For example, a value of zero may indicate that the UE did not use closed loop power control and a value of one may indicate that the UE used closed loop power control. Comparing the post-installation power control to pre-installation power control indicates whether power control has changed from pre-installation testing to post-installation testing. If comparing the post-installation power control to the pre-installation power control yields a value of zero, then power control has changed from pre-installation testing to post-installation testing and the power control was either closed loop in both pre-installation and post-installation testing or open loop in both pre-installation and post-installation testing. If the comparison yields a value of +1, then the comparison signifies that the UE used closed loop power control in post-installation testing and open loop power control in pre-installation testing. Conversely, if the comparison yields a value of −1, then the comparison signifies that the UE used open loop power control in post-installation testing and closed loop power control in pre-installation testing.

At 420, the computer system compares a post-installation Fifth Generation (5G) quality of service (QOS) identifier (5QI) to a pre-installation 5QI. The 5QI is an integer that points to a set of QoS characteristics that may include a priority level, packet delay, packet error or a combination thereof. The comparison identifies changes (between pre- and post-installation) in 5QI of a UE 204*a-e* used for testing. The changes are reflective of changes that are expected to be experienced by the UE 116 during operation as a result of updating the software package. As described herein, the computer system may compare the 5QIs collectively for a number of UEs 204*a-e* or individually.

A comparison, as described herein with reference to 402, 404, 406, 408, 410, 412, 414, 416, 418, 420, yields a comparison result. The comparison result may be a difference between post-installation performance indicator and a pre-installation performance indicator. Alternatively or additionally, the comparison result may be an indication of whether the difference between the post-installation performance indicator and the pre-installation performance indicator meets a criterion. The criterion may be met depending on the relationship between the difference and a threshold. For example, the criterion may be met if the difference is greater than a threshold, less than a threshold, in a particular range or outside a particular range. The computer may store, for each performance indicator type, information indicating the criterion for the performance indicator. The criterion may be modified depending on the reference evaluation described herein.

At 422, the computer system applies weights to the one or more comparison results of the performance indicators. A weight of a respective comparison result may be a numeric value and may indicate the contribution of the comparison result of a performance indicator to the software package validation. For example, the weights may be the same if the comparison results of the performance indicators equally contribute to the validation. Conversely, if a first performance indicator (and comparison result thereof) has a greater weight than a second performance indicator (and comparison result thereof), then the second performance indicator is associated with a lesser contribution to the software package validation than the first performance indicator. A weight of zero may specify that a performance indicator does not factor in validating the software package. A weight of 1 may indicate that no adjustment is associated with the performance indicator, and a weight of 2 may indicate that the performance indicator contributes twice as much to the determination of whether to validate the software package compared to an unadjusted performance indicator.

It is noted that the comparison outcome may be 1 if the criterion is met, and the comparison result may be 0 if the criterion is not met. As described herein, the fact that the criterion is met indicates that network conditions (reflected by an indicator) deteriorated due to the installation of the second software package. However, that convention may be reversed and a comparison result of 0 may suggest deteriorating conditions.

For example, in the event that the computer system compares, at 401, the three performance indicator types of UL RSSI, CQI and rank indicator, and the UL RSSI did not meet its respective criterion (comparison result of 0) and has a weight of 1, the CQI met its respective criterion (comparison result of 1) and has a weight of 2 and the rank indicator met its respective criterion (comparison result of 1) and has a weight of 2, then applying the weights to the performance indicators yields an outcome of 0, 2, 2. At 424, the computer system determines whether to validate the software package based on the weighted comparison results.

It is noted that the computer system may perform the method 400 (as well as other validation methods described herein) multiple times. For example, the drive test may be varied to reflect or capture different environments or geographic areas. A validation method may be performed for pre- and post-installation data of each one of multiple drive tests.

FIG. 5 shows a flow diagram of a method 500 for validating a software package based on performance indicators. At 502, the computer system aggregates the weighted comparison results to determine a sum. Continuing with the example of the three performance indicator types, the sum may be 0+2+2=4. At 504, the computer system compares the sum to a threshold. The threshold may be set based on the operator's tolerance for a performance degradation and the weights (or sum thereof). For example, when the sum of weights is 5, the aggregate determined at 502 will be 5 if all criteria are met, whereas if none of the criteria is met, then the aggregate will be 0. Accordingly, the operator may set the threshold to 0 or 1 to strictly perform the validation and without tolerating significant performance degradation. Alternatively, the operator may set the threshold to 3 or 4 to tolerate a more significant performance degradation. The threshold may also be set based on the type of software package that is being deployed. For example, if the operator intends to use the software package for an extended period of time (for example, more than a month), then the threshold may be lowered to 0 or 1. Alternatively, the threshold may be increased if the software package will only be used for two days.

The computer system, at 506, validates the software package if the sum is less than the threshold. Due to the fact that the sum is less than the threshold suggests that the post-installation performance indicator did not deteriorate below a specified tolerance as compared to the pre-installation performance indicator. Conversely, the computer system, at 508, invalidates the software package if the sum is greater than or equal to the threshold. The sum being greater than or equal to the threshold suggests that the post-installation performance indicators deteriorated in relation to the pre-installation performance indicators by more than a specified tolerance. For example, in the event that the threshold is 3, the evaluation of the three performance indicators described above yields a determination that the software package should be invalidated.

It is noted that although the computer system, at 506, validates the software package if the sum is less than the threshold the convention may be reversed. The computer system may invalidate the software package if the sum is less than the threshold, and the computer system may validate the software package if the sum is greater than or equal to the threshold.

Some performance indicator types may increase in value as the network performance improves and decrease in value as the network performance deteriorates. However, other performance indicator types may move in the opposite direction and decrease in value as the network performance improves and increase in value as the network performance deteriorates. The criteria or thresholds thereof may be set in accordance with a convention that, whereby a finding that a criterion is met indicates a deteriorating condition or vice-versa in the event that the convention is reversed.

FIG. 6 shows a flow diagram of a method 600 for validating a software package based on performance indicators. The method 600 may be implemented in the event that the comparison results yield a difference between a post-installation performance indicator and pre-installation performance indicator. At 602, the computer system compares, for each performance indicator type, the weighted comparison result of the performance indicator to a respective threshold. The threshold may pertain to the particular performance indicator type that is compared. The thresholds for different types of particular performance indicators may be different due to the fact that the performance indicators gauge different properties of network communication. For example, an UL RSSI of −55 dBm is considered to represent a strong signal. A threshold for the RSSI may be set to −5 dBm. The threshold reflects the fact that it is tolerable (and deemed as a 'pass') for the RSSI to decrease to a value between −55 and −60 dBm as a result of the installation of the software package. An increase in the RSSI is also tolerable. However, a drop to less than −60 dBm is deemed a 'fail'. Further, a 4-bit CQI index of 3 represents QPSK modulation with a code rate of 449 and an efficiency of 0.8770, whereas a CQI index of 6 represents a 16QAM modulation with a code rate of 616 and an efficiency of 2.4063. The CQI threshold may be set to −2 such that a drop from CQI index 6 to CQI index 3 (CQI index comparison difference of −3) is deemed as a 'fail', but a drop from CQI index 6 to CQI index 5 (CQI index comparison difference of −1) is deemed is deemed as a 'pass'.

At 604, the computer system determines, for each performance indicator, whether the weighted comparison result meets a criterion. For example, the criterion may be met if the comparison to the threshold is outside a tolerance specified by the threshold (deemed as a 'fail'). Conversely, the criterion may be unmet if the comparison to the threshold is within the tolerance specified by the threshold (deemed as a 'pass').

At 606, the computer system determines the number of performance indicators having a weighted comparison result that meets the criterion or the number of performance indicators having that a weighted comparison result that does not meet the criterion. The computer system obtains a count of the performance indicators that do not change (as a result of the software package installation) by more than a respective performance indicator threshold. Additionally or alternatively, the computer system obtains a count of the performance indicators that change (as a result of the software package installation) by more than the respective performance indicator threshold.

At 608, the computer system determines, based on the number of performance indicators, whether to validate the software package. The computer system may validate the software package if the number of performance indicators that do not meet the criterion is greater than or equal to a threshold number of performance indicators. For example, a tolerance of two may be set, and if the number of performance indicators that do not meet the criterion is greater than or equal to two, then the software package may be validated. Continuing with the example, if five performance indicators are evaluated (such as, accessibility performance indicators, mobility performance indicators, UL RSSI, CQI and rank indicator) and the tolerance is set to two, then the software package may be validated if none of or one of the performance indicators meet respective criteria, but the software package is not validated if three performance indicators (such as, UL RSSI, CQI and rank indicator) meet respective criteria.

Figure 7:
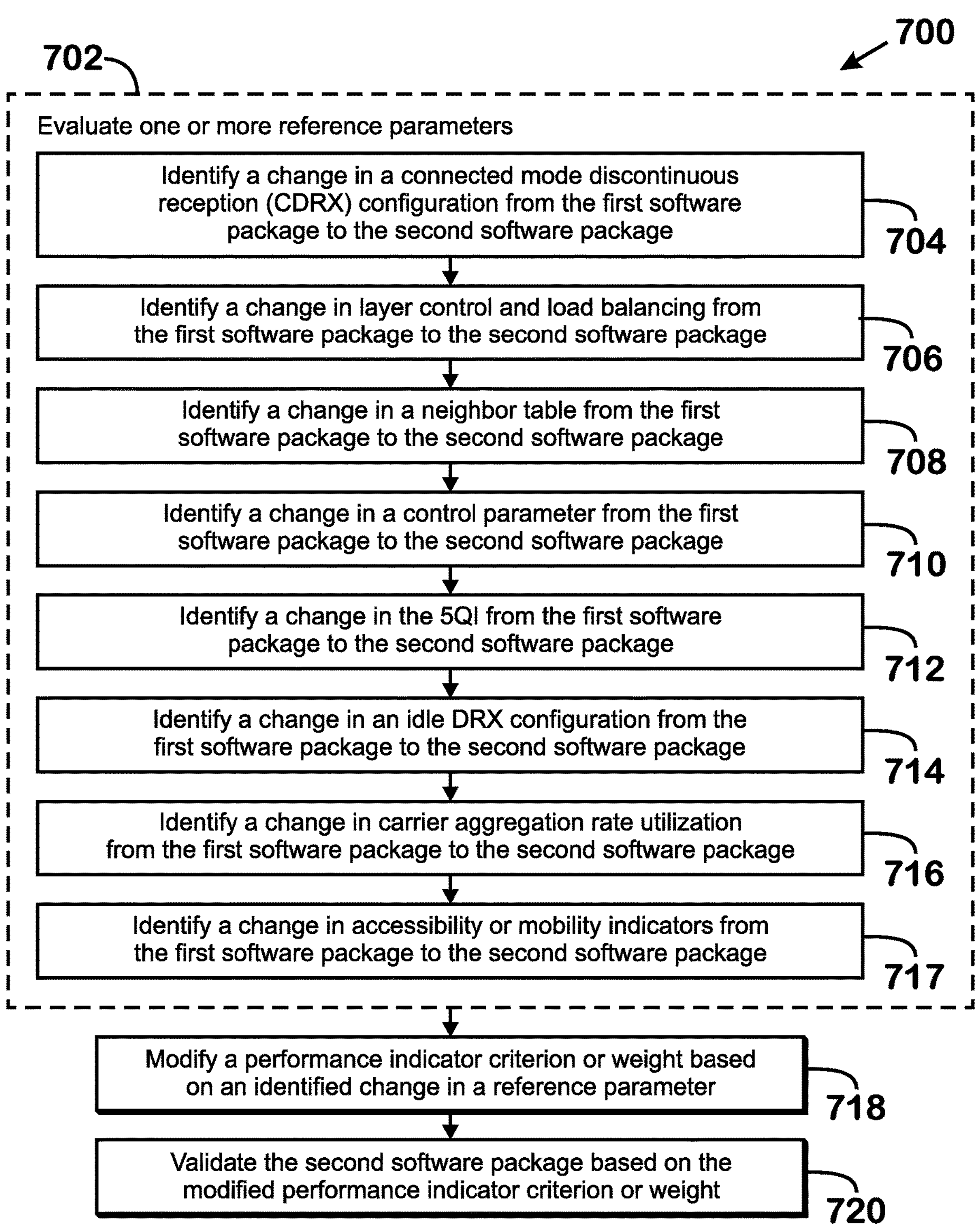
FIG. 7 shows a flow diagram of a method for performing reference evaluation.

FIG. 7 shows a flow diagram of a method 700 for performing reference evaluation. Reference evaluation may be used to modify the criterion used for determining the comparison result of a performance indicator. The second software package may add, remove or change features in relation to the first software package. A change in features may call for revising the criterion of a performance indicator such that greater changes or lesser changes in the performance indicator may be considered "within the range." In particular, the techniques described herein for package validation may be automated and the computer system may output an indication of whether the software package is to be validated or not without human input. Accordingly, the criterion used for determining the comparison result of a performance indicator may automatically be changed depending on the reference evaluation described herein.

The reference evaluation may be used to change the criterion for any indicator or configuration described herein. For example, in the event that a mobility performance indicator is the RACH detection threshold, the reference evaluation may be used to adjust the circumstances of when the criterion is determined to be met. The reference evaluation may cause the criterion to be determined as being met if the difference between the post- and pre-installation RACH detection thresholds is 3 dB or more instead of 1 dB or more. As described herein, the second software package may introduce features that were not part of the first software package or remove features of the first software package. For example, if the second software package removes slot aggregation, then the criterion of the RACH detection threshold may be relaxed to 3 dB or less instead of 1 dB or less. Slot aggregation improves the network's ability to detect signals transmitted by the UE. If slot aggregation is removed as a feature, then the RACH detection threshold is expected to increase by a greater magnitude between pre- and post-installation than in the scenario where slot aggregation is not removed. Accordingly, the reference evaluation detects the removal of slot aggregation as a feature and adjusts the criterion of the RACH detection threshold.

In the method 700, the computer system, at 702, evaluates one or more reference parameters. The computer system selects the one or more reference parameter types from the parameter types described herein with reference to 704-717. The computer system selects the one or more reference parameter types from a list including a connected mode discontinuous reception (CDRX) configuration, layer control and load balancing, neighbor table, control parameter, 5QI, idle DRX configuration, carrier aggregation rate utilization, performance indicator and mobility indicator. The computer system identifies changes in the one or more selected reference parameter types as described herein.

The computer system, at 704, identifies a change in a connected mode discontinuous reception (CDRX) configuration from the first software package to the second software package. The CDRX configuration may specify power and resource savings settings for a UE that is connected to the network. A change in CDRX configuration may inform a change in a performance indicator criterion. For example, if the difference between the post-installation active duration (or 'on duration') of the CDRX and the pre-installation active duration is less than zero, then a performance indicator criterion may be relaxed to become more tolerant of a performance degradation. Conversely, if the inactive duration (or 'off duration') of the CDRX is reduced, then a performance indicator criterion may be made more stringent to become less tolerant of a performance degradation. If the difference between a post-installation active duration of the CDRX and a pre-installation active duration of the CDRX is positive, the computer system modifies a performance indicator criterion to associate the criterion with a larger requisite reduction in the performance indicator for invalidating the second software package.

The computer system, at 706, identifies a change in layer control and load balancing from the first software package to the second software package. The second software package may enable a load balancing technique that was not part of the first software package. Conversely, the second software package may disable a load balancing technique that was part of the first software package. The change in load balancing may be a configuration change, whereby more data or less data is permitted to be trafficked using another radio access technology (RAT) (e.g., IEEE 802.11 communication protocol or Wi-Fi) of the UE. For example, the network 100 may be a Fifth Generation (5G) or New Radio (NR) network, and the configuration change may result in more or less of the UE's data being trafficked by Wi-Fi. The computer system identifies a change in the techniques and mechanisms used to manage different protocol layers. The computer system uses the identified changes to change in a performance indicator criterion. If the difference between the amount of data permitted to be trafficked using the IEEE 802.11 communication protocol post-installation and the pre-installation amount is positive, the computer system may modify a performance indicator criterion to associate the modified criterion with a smaller requisite reduction in the performance indicator for invalidating the second software package.

The computer system, at 708, identifies a change in a neighbor table from the first software package to the second software package. The neighbor table may be a list of a number of neighboring cells maintained by the gNB or UE. The neighbor table indicates to the UE the neighboring cells of the UE. The UE may use the neighbor table for determining when to perform a handover, determining when to perform cell selection/reselection or a combination thereof. The neighbor table may indicate, for each cell, a cell ID, a signal strength or quality indicator (such as, SNR) of the cell, frequency band information of the cell or a combination thereof. The UE may use the neighbor table for handover. For example, the UE may determine whether a cell of the neighbor table offers an improved signal quality.

If the computer system determines that a difference in the neighbor table is negative and resulted in fewer neighboring cells being available or resulted in the available neighboring cells having a lower signal strength or quality indicator, then the computer system may relax a mobility performance indicator criterion. For example, a reduction in the handover success rate may be expected in the scenario where fewer neighboring cells are available to the UE or in the scenario where the available neighboring cells have a lower signal strength or quality indicator. The computer system may adjust the mobility performance indicator criterion to tolerate more handover failures before invalidating the software package. The computer system may modify a handover success rate criterion to associate the handover success rate criterion with a larger requisite reduction in a handover success rate for invalidating the second software package. The degradation in performance may at least partially be explained by a neighbor table configuration change rather than a software issue in the software package.

As with other reference parameter types described herein, the change in the neighbor table from the first software package to the second software package may be compared individually or collectively for selected UEs 204*a-e* as described herein.

The computer system, at 710, identifies a difference in a control parameter from the first software package to the second software package. The control parameter may be a power level of a demodulation reference signal (DM-RS), a power level of a synchronization signal block (SSB), a power level of a channel state information (CSI) or a power level periodicity of the UE. The DM-RS, SSB and CSI may be transmitted on a resource element (RE). If the power level of the DM-RS, SSB or CSI changes from the first software package to the second software package, then the criterion for a performance indicator may be changed. If the computer system determines that the power level of the DM-RS, SSB or CSI decreased, the computer system may relax a performance indicator criterion. Conversely, if the power level of the DM-RS, SSB or CSI increased, the computer system may make a performance indicator criterion more stringent and tolerate fewer deteriorations in the performance indicator before invalidating a package.

The computer system, at 712, identifies a change in the 5QI from the first software package to the second software package. The 5QI is described herein as a performance indicator that is used to determine whether to validate the software package. Additionally or alternatively, changes in the 5QI that occur from the first software package to the second software package may be used to adjust a performance indicator criterion. The adjustment of the performance indicator criterion aids in making the comparison of the network performance under the first and second software packages fair. The adjustment accounts for the fact that changes in the network performance (or indicators thereof) may be attributable to 5QI rather than the second software package or features thereof.

The computer system, at 714, identifies a change in an idle DRX configuration from the first software package to the second software package. The idle DRX configuration configures a sleep cycle of the UE. The idle DRX configuration may include a DRX cycle length that sets a duration of the DRX cycle during which the UE operates in idle DRX, an on-duration timer that sets a duration of an awake time of the UE, an inactivity timer that sets a period of inactivity after which the UE enters idle DRX, a DRX inactivity timer that sets a duration of time during which the UE remains in the DRX idle state before transitioning to another state or a combination thereof.

For example, if upon installation of the second software package, the on-duration or inactivity timers are shortened as compared to the first software package, then the conditions that are to be satisfied before the UE operates in a sleep state are made less stringent by the configuration. The UE is more likely to operate in the sleep state when the second software package is installed than when the first software package is installed. That may result in a performance degradation for the UE. Accordingly, the computer system may change a data rate performance indicator criterion or a data rate threshold of the data rate criterion. For example, a data rate threshold may be increased in magnitude to make the data rate criterion more tolerant of reductions in the data rate. A greater reduction in the data rate may be required for the data rate criterion to be met. Accordingly, the computer system identifies that a reduction in the data rate may be attributed at least in part to changes in the idle DRX configuration.

Additionally or alternatively, the computer system may also change the weight associated with a performance indicator type in response to identifying a change in a reference parameter. For example, the computer system may set the weight of the data rate performance indicator to zero (so as to take the data rate performance indicator out of software package validation) in response to determining that the idle DRX configuration changed.

The computer system, at 716, identifies a change in carrier aggregation rate utilization from the first software package to the second software package. Carriers may be combined to increase data throughput in the network. Carrier aggregation rate utilization indicates a ratio between data transmitted over aggregated carriers and a maximum achievable amount of data transmission over the aggregated carriers.

The computer system may change a performance indicator criterion or weight (e.g., described herein with reference to FIGS. 4-6) depending on the change in the carrier aggregation rate utilization. For example, if a difference between the carrier aggregation rate utilization using the second package and the carrier aggregation rate utilization using the first package is positive, then the implementation of the second software package resulted in an increase in the carrier aggregation rate utilization. The computer system may reduce the magnitude of the data rate threshold of the data rate criterion. For example, the magnitude of the data rate threshold may be halved and, accordingly, the data rate criterion may be met under more stringent conditions.

The computer system, at 717, identifies a change in an accessibility performance indicator from the first software package to the second software package, a change in a mobility performance indicator from the first software package to the second software package or both. As described herein, the accessibility performance indicator may be a data rate (a control data rate or a non-control user data rate) of the drive test UEs 204*a-e*, a number of symbols allocated to the drive test UEs 204*a-e*, a number of symbols utilized by the drive test UEs 204*a-e*, an indication of whether power scaling (or power boosting) was performed by the drive test UEs 204*a-e* or a combination thereof. A change in the data rate, a number of symbols allocated or utilized or power scaling may trigger changing a criterion or weight of a performance indicator.

The computer system, at 718, modifies a performance indicator criterion or weight (e.g., described herein with reference to FIGS. 4-6) based on an identified change in a reference parameter. The computer system may modify the criterion or weight of any number of the indicator, configuration or alarm types described herein. For example, for each indicator, configuration or alarm type, the computer system may store a criterion. The computer system may modify the criterion depending on identified change in the reference parameter.

The computer system, at 720, validates the second software package based on the modified performance indicator criterion or weight. In determining whether to validate the second software package as described herein, the computer system uses the modified performance indicator criterion or weight. For example, after the performance indicator criterion or weight is modified, at 718, the method 400 of FIG. 4 may be performed with the use of the modified criterion or weight to determine whether to validate the software package. The computer system may initially store a criterion or weight for a performance indicator. Then the computer system may perform the method 700 and modify the stored criterion or weight for a performance indicator at 718. At 720, the computer system may perform the method 400 using the modified criterion or weight to determine whether to validate the software package.

The computer system may output a report of the changes in the reference parameters. The report may be provided to a software vendor, whereby the software vendor may make modifications to the second software package that mitigate the identified changes in the reference parameters.

The computer system may make a determination as to whether to validate the second software package based on a transport indicator (e.g., as described with reference to FIG. 8 herein). Additionally or alternatively, the computer system may determine whether to validate based on a network alarm. A transport indicator is a metric for evaluating the performance of the transport network. The transport network represents the transport channels within the gNB 114. For example, the radio unit 110 may be coupled to the distributed unit 108 using a first transport channel and the distributed unit 108 may be coupled to the central unit 106 using a second transport channel. The transport network also represents the transport channels between the gNB 114 and the core network 102. A transport indicator may be of any type including a data rate of the transport network or a channel thereof, a packet loss (or dropped packet) rate of the transport network or a channel thereof, a congestion of the transport network or a channel thereof or an availability of the transport network or a channel thereof. A network alarm may be a voltage standing wave ratio (VSWR) alarm, an RSSI alarm or cell lock alarm.

The transport indicators and network alarms may be tracked and stored by the gNB 114 or an entity thereof. A UE may not receive a transport indicator or a network alarm, and the log data of the UEs 204*a-e* may not include the transport indicators obtained during testing or the network alarms triggered during testing. Accordingly, data representative of the transport indicators or network alarms may be retrieved from the gNB 114 or an entity thereof and provided to the computer system for determining whether to validate the second software package. For example, the computer system may be a computer system of an operator that manages the network. The computer system may receive data representing the transport indicators and network alarms from the gNB 114.

Figure 8:
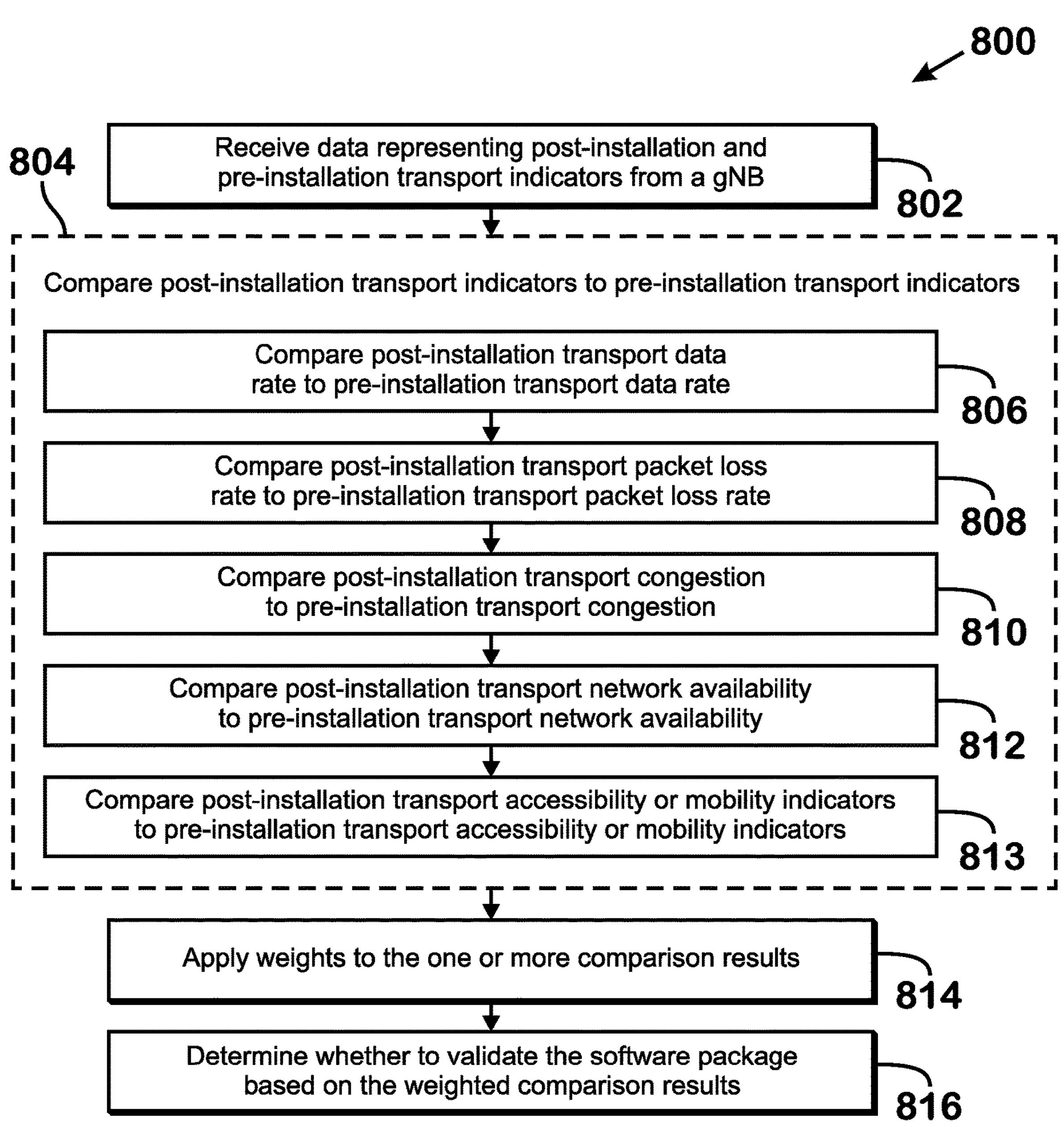
FIG. 8 shows a flow diagram of a method for validating a software package based on transport indicators.

FIG. 8 shows a flow diagram of a method 800 for validating a software package based on transport indicators. At 802, a computer system receives data representing post-installation and pre-installation transport indicators from the gNB 114. At 804, the computer system compares post-installation transport indicators to pre-installation transport indicators to determine whether to validate the software package. The computer system may select one or more transport indicator types to evaluate. The computer system may compare any number of pre- and post-installation transport indicators from a list of performance indicators including a data rate of the transport network, a packet loss (or dropped packet) rate of the transport network, a congestion of the transport network, an availability of the transport network and an accessibility indicator of the transport network. The computer system may select a set of transport indicators from the list.

At 806, the computer system compares a post-installation transport data rate to a pre-installation transport data rate. The computer system may determine the transport data rate from the data received from the gNB 114. The transport data rate may be a measure of how much data is trafficked per unit time (e.g., megabit per second (Mbps)) over a transport channel within the gNB 114 (e.g., between the radio unit 110 and the distributed unit 108 or between the distributed unit 108 and the central unit 106) or between the gNB 114 and the core network 102.

Comparing the post-installation transport data rate to the pre-installation transport data rate may yield a difference between the transport data rate from pre-installation (first software package) to post-installation (second software package), which indicates whether the transport data rate increased, decreased or stayed the same. Alternatively or additionally, as with other comparisons described herein, comparing the post-installation transport data rate to the pre-installation transport data rate may yield a determination as to whether a criterion for the transport data rate is met. The criterion may be met depending on the relationship between the difference and a threshold. For example, the criterion may be met if the difference is greater than a threshold, less than a threshold, in a particular range or outside a particular range. The computer may store, for each indicator, information indicating the criterion for the indicator is met. The criterion may be modified depending on the reference evaluation described herein.

The criterion for the data rate indicator may be met if the data rate indicator has decreased by more than a certain threshold. For example, the threshold may be 10 Mbps, and the criterion may not be satisfied if from pre-installation (first software package) to post-installation (second software package), the transport data rate increased or if the transport data rate decreased by 10 Mbps or less. Conversely, the criterion may be satisfied if from pre-installation (first software package) to post-installation (second software package), the transport data rate decreased by more than 10 Mbps. The convention may be reversed as described herein, whereby the criterion may be satisfied if the transport data rate increased or if the transport data rate increased or decreased by 10 Mbps or less, and the criterion may not be satisfied if the transport data rate decreased by more than 10 Mbps.

At 808, the computer system compares a post-installation packet loss rate to a pre-installation packet loss rate. A packet trafficked over a transport channel may be deemed lost if the packet cannot be successfully decoded. The packet loss rate represents a proportion of packets that are lost over a transport channel to a total number of transmitted packets over the transport channel. The comparison may yield a difference between the packet loss rate from pre-installation (first software package) to post-installation (second software package) or an indication of whether the packet loss rate meets or does not meet a packet loss criterion.

At 810, the computer system compares a post-installation transport congestion to a pre-installation transport congestion. Congestion reflects the level of traffic of the transport channel and whether the transport channel is overloaded with traffic. Congestion may be indicated by a buffering time over the transport channel, transmission delay over the transport channel, latency over the transport channel, connection timeouts over the transport channel or a combination thereof. Comparing the post-installation transport congestion to the pre-installation transport congestion may yield a difference between the congestion of the first software package to the congestion of the second software package or an indication of whether the congestion meets or does not meet a congestion criterion.

At 812, the computer system compares a post-installation transport availability to a pre-installation transport availability. Availability of a transport channel is the proportion (e.g., percentage) of time that the transport network is operational and able to traffic data. Comparing the post-installation transport availability to the pre-installation transport availability may yield a difference between the availability using the first software package to the availability using the second software package or an indication of whether the availability meets or does not meet a congestion criterion. For example, the threshold for the criterion may be 3%, and the criterion may not be met if the availability decreased by 3% or less and the criterion may be met if the availability decreased by more than 3%. In the example, if availability decreased from 97% to 92% after the installation of the second software package, then the criterion for availability is met.

The computer system, at 717, compares a post-installation accessibility performance indicator to a pre-installation accessibility performance indicator, a post-installation mobility performance indicator to a pre-installation mobility performance indicator or both. The accessibility performance indicator of the transport network may be a data rate (a control data rate or a non-control user data rate) of a transport channel, a number of symbols allocated to a transport channel, a number of symbols utilized by a transport channel, an indication of whether power scaling (or power boosting) was performed for a transport channel or a combination thereof.

A comparison, as described herein with reference to 806-813, yields a comparison result. The comparison result may be a difference between a post-installation transport indicator and a pre-installation transport indicator. Alternatively or additionally, the comparison result may be an indication of whether the difference between the post-installation transport indicator and the pre-installation transport indicator meets a criterion. The criterion may be met depending on the relationship between the difference and a threshold. For example, the criterion may be met if the difference is greater than a threshold, less than a threshold, in a particular range or outside a particular range. The computer may store, for each transport indicator, information indicating the criterion for the transport indicator. The criterion may be modified depending on the reference evaluation described herein. After evaluation, the computer system may store, for each transport indicator, information indicating the comparison result (e.g., whether the criterion is met, a difference between the transport indicator with the second software package installed and the transport indicator with the first software package installed or both).

At 814, the computer system applies weights to the one or more comparison results of the transport indicators. A weight of a respective comparison result may be a numeric value and may indicate the contribution of the comparison result of a transport indicator to the software package validation. The weight may be applied as described herein with reference to FIG. 4. A weight of zero may specify that a transport indicator does not factor in validating the software package. The weights may be normalized (e.g., to 1). If the weights are normalized and the first transport indicator has a weight of 0.5 and the second transport indicator has a weight of 0.75, then the second transport indicator contributes 50% more to the validation than the first transport indicator.

At 816, the computer system determines whether to validate the software package based on the weighted comparison results. The computer system may use the techniques described herein with reference to FIGS. 5 and 6 to determine whether to validate the software package. For example, the computer system may aggregate the weighted comparison results to determine a sum and compare the sum to a threshold. The computer system may validate the software package if the sum is greater than threshold and invalidate the software package if the sum is less than or equal to threshold or vice-versa. Alternatively, the computer system may determine the number of transport indicators that meet their respective criteria and determine, based on the number of transport indicators, whether to validate the software package.

Alternatively or additionally, the computer system may validate the software package based on network alarms. A network alarm may be a VSWR alarm, an RSSI alarm, a cell lock alarm or a cell unlock alarm. The VSWR alarm may indicate that an impedance of a transmission line in the network does not match an impedance of connected RF devices (e.g., antennas or transceivers of the radio unit 110). The RSSI alarm may indicate that an RSSI level in the network dropped below a threshold. The cell lock alarm may indicate that a cell (e.g., carrier frequency) has become locked and is operating and providing wireless coverage to UEs. The cell unlock alarm indicates that a cell is out of service.

The computer system may receive data representing the alarms from the gNB. The computer system may invalidate the software package if the data indicates that an alarm has been triggered (or raised) during the testing of the software package. Alternatively, the triggering of the alarm may be considered together with transport indicators. For example, if an alarm is triggered, the computer system may deem that an additional criterion for invalidating the software package has been met. If an alarm is raised, the computer system may increase the number of transport indicators that meet their respective criteria by one and determine whether to validate the software package based on the increased number.

Figure 9:
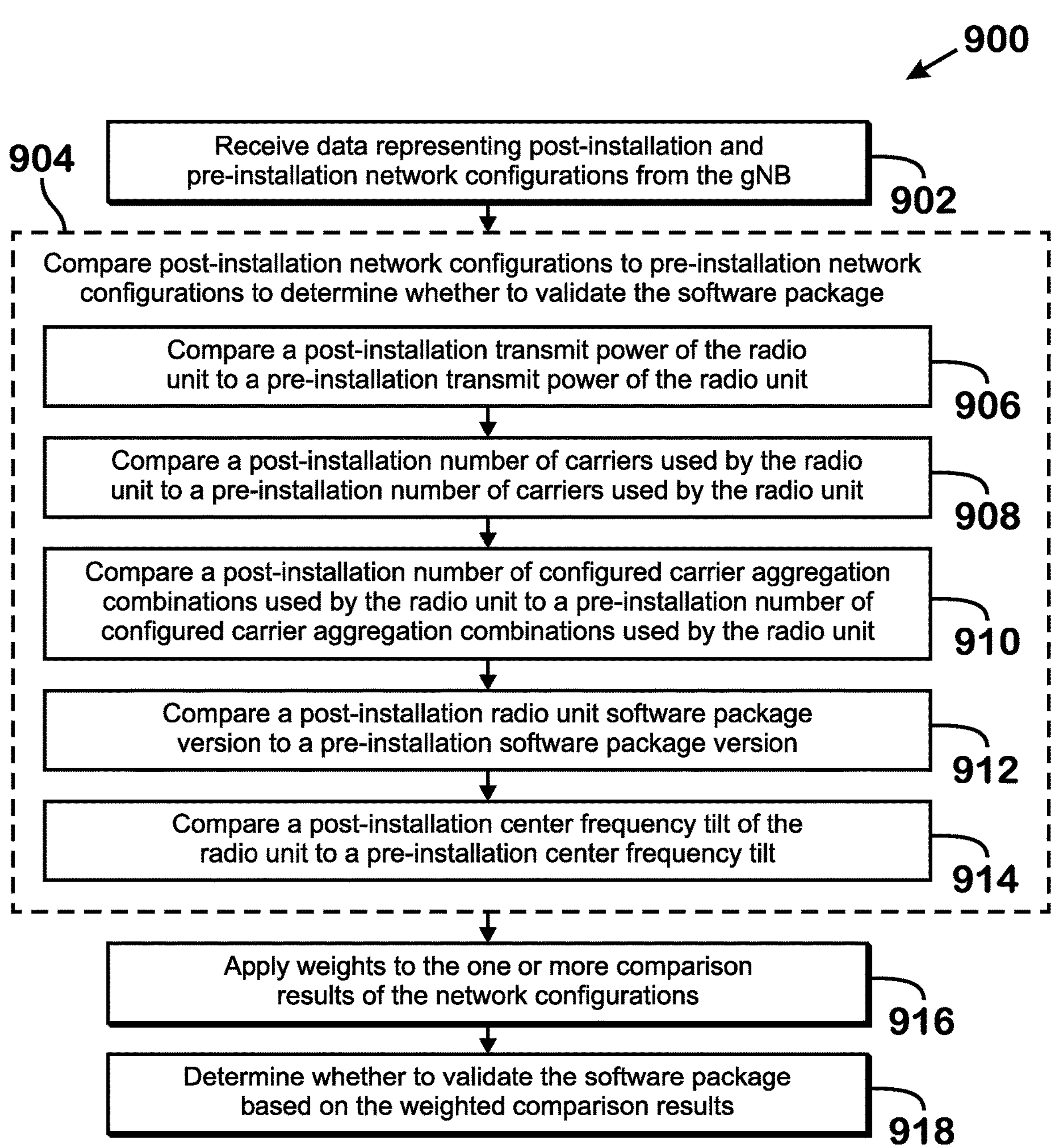
FIG. 9 shows a flow diagram of a method for validating a software package based on network configurations.

FIG. 9 shows a flow diagram of a method 900 for validating a software package based on network configurations. At 902, a computer system receives data representing post-installation and pre-installation network configurations from the gNB 114. As described herein, a network configuration may be a transmit power of the radio unit 110, a number of carriers used by the radio unit 110, carrier aggregation (CA) combinations that are configured in the network, radio unit 110 software package version or center frequency tilts of the radio unit 110.

At 904, the computer system compares post-installation network configurations to pre-installation network configurations to determine whether to validate the software package. The computer system may select one or more network configurations to evaluate. The computer system may compare any number of pre- and post-installation network configurations from a list of network configurations including the transmit power of the radio unit 110, the number of carriers used by the radio unit 110, the CA combinations that are configured in the network, the radio unit 110 software package version or the center frequency tilt of the radio unit 110.

The computer system may select the one or more network configurations to evaluate based on an input of an operator of the network. For example, the operator may prioritize the transmit power and the number of carriers. Accordingly, the operator may command the computer system to include at least the transmit power and the number of carriers in the evaluation. Additionally or alternatively, the computer system may receive an indication of features affected by the second software package and may select the network configurations based on the type of features that are updated by the second software package. The computer system may select network configurations that are most likely to be affected by the updates made by the second software package. For example, if the second software package alters power control strategies of the network, then the computer system may select the transmit power due to the fact that a change in the power control strategies or an error in updating the power control strategies may be reflected in a transmit power change.

At 906, the computer system compares a post-installation transmit power of the radio unit 110 to a pre-installation transmit power of the radio unit 110. The computer system may determine the transmit power of the radio unit 110 from the data received from the gNB 114. The transmit power of the radio unit 110 may be the power used by the radio unit 110 to transmit signals to the UE. Comparing the post-installation transmit power to the pre-installation transmit power may yield a difference in the transmit power. Alternatively or additionally, comparing the post-installation transmit power to the pre-installation transmit power may yield a determination as to whether a criterion for the transmit power is met. The criterion may be met depending on the relationship between the difference and a threshold. For example, the criterion may be met if the difference is greater than a threshold, less than a threshold, in a particular range or outside a particular range. The computer system may store, for each compared configuration, information indicating the criterion for the indicator. The criterion may be modified depending on the reference evaluation described herein.

The criterion for the transmit power may be met if the transmit power has decreased by more than a certain threshold. For example, the threshold may be 1 decibel-milliwatts (dBm), and the criterion may not be met if from pre-installation (first software package) to post-installation (second software package), the transmit power increased or decreased by 1 dBm or less. Conversely, the criterion may be satisfied if from pre-installation (first software package) to post-installation (second software package), the transmit power decreased by more than 1 dBm. Continuing with the example, if the transmit power of the radio unit 110 decreases from 15 dBm to 13 dBm (a difference of 2 dBm) as a result of installing the second software package, then the criterion may be deemed to be met.

At 908, the computer system compares a post-installation number of carriers used by the radio unit 110 to a pre-installation number of carriers used by the radio unit 110. A carrier may be a frequency carrier (e.g., for a resource element). Comparing the post-installation number of carriers to the pre-installation number of carriers may yield a difference in the number of carriers. Alternatively or additionally, comparing the post-installation number of carriers to the pre-installation number of carriers may yield a determination as to whether a criterion for the number of carriers is met.

The criterion may be met if the number of carriers has decreased by more than a certain threshold. For example, the threshold may be two carriers, and the criterion may not be met if the number increased or decreased by two or less. Conversely, the criterion may be satisfied if the number of carriers decreased by more than two. Continuing with the example, if the number of carriers decreases from 12 to 8 (a difference of 4) as a result of using the second software package, then the criterion may be deemed to be met.

At 910, the computer system compares a post-installation number of configured carrier aggregation combinations used by the radio unit 110 to a pre-installation number of configured carrier aggregation combinations used by the radio unit 110. Carrier aggregation combines frequency resources (or carriers) used by the network to expand the available bandwidth for downlink or uplink. When aggregating carriers, various combinations of carriers may be possible. The radio unit 110 may be configured to use a subset of the available combinations when communicating with the UEs.

Comparing the post-installation number of combinations to the pre-installation number of combinations may yield a difference in the number of combinations. Alternatively or additionally, the comparison may yield a determination as to whether a criterion for the number of combinations is met. The criterion may be met if the number of combinations has decreased by more than a threshold. For example, the threshold may be two combinations, and the criterion may not be met if the number increased or decreased by two or less. Conversely, the criterion may be satisfied if the number of combinations decreased by more than two.

At 912, the computer system compares a post-installation radio unit 110 software package version to a pre-installation software package version. A criterion for the software package version may be met if the software package version has changed. Conversely, the criterion for the software package version may not be met if the software package version remains the same.

At 914, the computer system compares a post-installation center frequency tilt of the radio unit 110 to a pre-installation center frequency tilt. The tilt angle of the radio unit 110 may be an angle that a beam irradiated by the radio unit 110 makes with a reference axis. The beam may be irradiated using a frequency positioned near a center of a bandwidth used by or allocated to the radio unit 110. For example, the reference axis may lie in a horizontal plane. A criterion may be met if the center frequency tilt has changed by more than a certain threshold. For example, the threshold may be two degrees, and the criterion may not be met if the center frequency tilt increased or decreased by two degrees or less. Conversely, the criterion may be satisfied if the center frequency tilt increased or decreased by more than two degrees.

At 916, the computer system applies weights to the one or more comparison results of the network configurations. A weight of a respective comparison result may be a numeric value and may indicate the contribution of the comparison result to the software package validation. For example, the weights may be the same if the comparison results equally contribute to the validation. Conversely, if a first network configuration has a greater weight than a second network configuration, then the second network configuration is associated with a greater contribution than the first network configuration. A weight of zero may specify that a configuration does not factor in validating the software package.

At 918, the computer system determines whether to validate the software package based on the weighted comparison results. The computer system may use the techniques described herein with reference to FIGS. 5 and 6 to determine whether to validate the software package. For example, the computer system may determine the number of network configurations that meet their respective criteria and determine, based on the number of network configurations, whether to validate the software package. For example, in the event that the network configurations are equally weighted and the computer system compares two network configurations, the computer system may invalidate the software package if two of the configurations have criteria that is met. Conversely, the computer system may validate the software package if one configuration or no configurations have met their respective criteria.

If the computer system determines to validate the second software package, then the network entity (e.g., the radio unit 110, the distributed unit 108 or the central unit 106) may use the software package during operations to provide coverage to UEs. That is, a network operator may deploy software package in the gNB 114 or the computer system may automatically send a signal to the gNB 114 indicating that the software package is to be installed. The computer system may output data to the gNB 114 indicating that the computer system has validated the software package. The gNB 114 may receive the data. In response to receiving the data, the gNB 114 may deploy the second software package and use the software package to operate the network entity when providing wireless coverage.

Conversely, if the computer system determines to invalidate the second software package, then the network entity may refrain from using the software package during operations. The computer system may output data to the gNB 114 indicating that the computer system has invalidated the software package. The gNB 114 may receive the data. In response to receiving the data, the gNB 114 may remove or uninstall the second software package from the network entity or the server thereof. The gNB 114 may revert to the first software package or another software package. The gNB 114 may install the first software package (and uninstall the second software package) on the network entity or the server thereof and may operate the network entity using the first software package to provide coverage to UEs.

Figure 10:
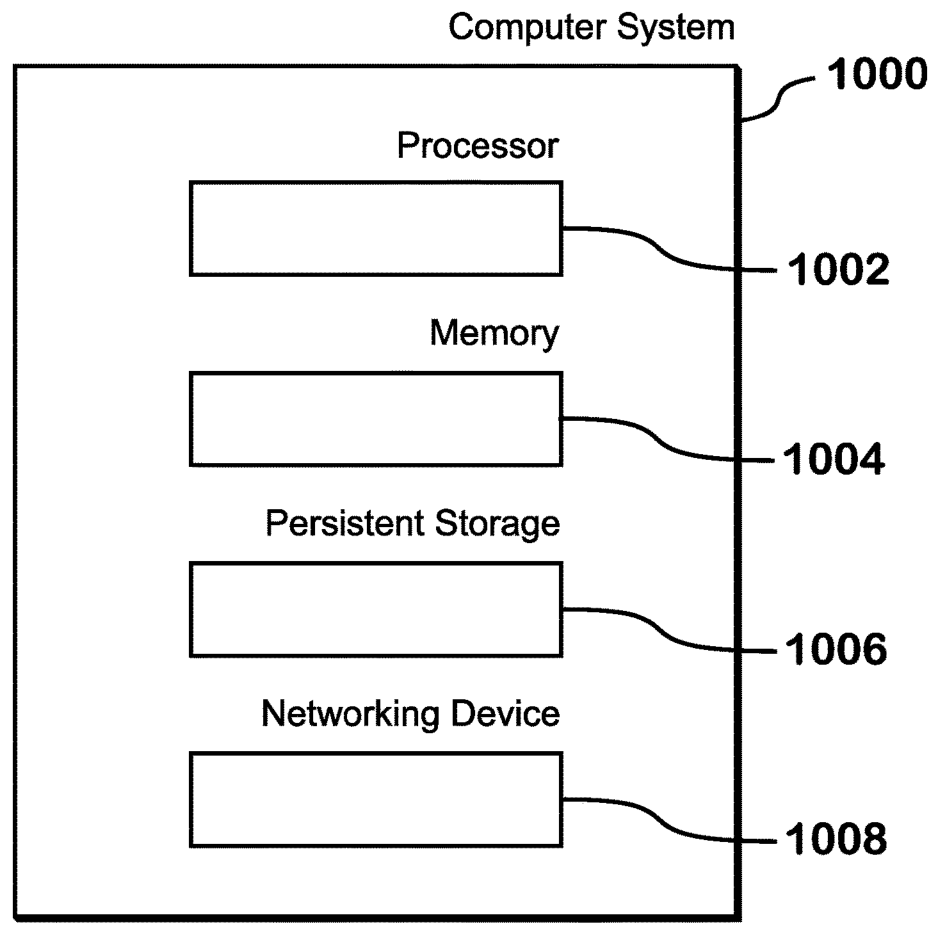
FIG. 10 shows a block diagram of a computer system.

FIG. 10 shows a block diagram of a computer system 1000. The computer system 1000 may be one or more servers, computers, cloud computing platforms, virtual machines or a combination thereof. The computer system 1000 includes a processor 1002, memory 1004, persistent storage 1006 and network device 1008. The computer system 1000 may also include other components (not shown). As described herein, the computer system 1000 may be a computer system 202 of the drive testing system 200 or another computer system to which post- and pre-installation logs have been transferred. The computer system 1000 may be receive reference parameters, transport indicators, network configurations or a combination thereof from the gNB 114 or another network entity.

The processor 1002 may be a controller, microcontroller or microprocessor, and may include a central processing unit ("CPU") or an arithmetic and logic unit (ALU) for executing computer programs or executable instructions. The computer system 1000 uses the processor 1002 to determine whether to validate the second software package as described herein. The processor 1002 may compare performance indicators, reference parameters, transport indicators, network configurations or a combination thereof. The processor 1002 may determine whether a criterion for a performance indicator, reference parameter, transport indicator or network configuration is met. The processor 1002 may determine whether to validate a software package based on the comparison or satisfaction of the criterion.

The memory 1004 stores executable instruction and data. The processor 1002 executes the executable instructions, which causes the processor 1002 to perform the technique described herein including comparing pre-installation and post-installation performance indicators, pre-installation and post-installation reference parameters, pre-installation and post-installation transport indicators, pre-installation and post-installation network configurations or a combination thereof, determining whether a criterion is met and determining whether to validate a software package based on the comparison or satisfaction of the criterion. The memory 1004 may also store an operating system including a kernel and device drivers. The memory 1004 may also store data used to evaluate a criterion or a specification of the criterion.

The persistent storage device 1006 may be a virtual drive, a hard drive or a flash drive, among others. The persistent storage device 1006 persistently stores programs and data. The persistent storage device 1006 may store a log of performance indicators of the UEs 204*a-e*. The persistent storage device 1006 may also store the reference parameters, transport indicators and network configurations received from the gNB 114.

The networking device 1008 enables the computer system 1000 to communicate with other devices, such as the gNB 114 and the UEs 204*a-e*. The networking device 1008 may be a modem, antenna, radio transmitter, receiver or transceiver, optical transmitter, receiver or transceiver or wireless or wired port, among others. Further, the computer system 1000 may include networking hardware, such as switches, routers or repeaters, among others.

The computer system 1000 may receive, using the networking device 1008, data representing pre-installation and post-installation performance indicators from the UEs 204*a-e* and pre-installation and post-installation reference parameters, transport indicators and network configurations from the gNB 114. The computer system 1000 may output data, over the networking device 1008, to the gNB 114 indicating whether the software package is validated.

Figure 11:
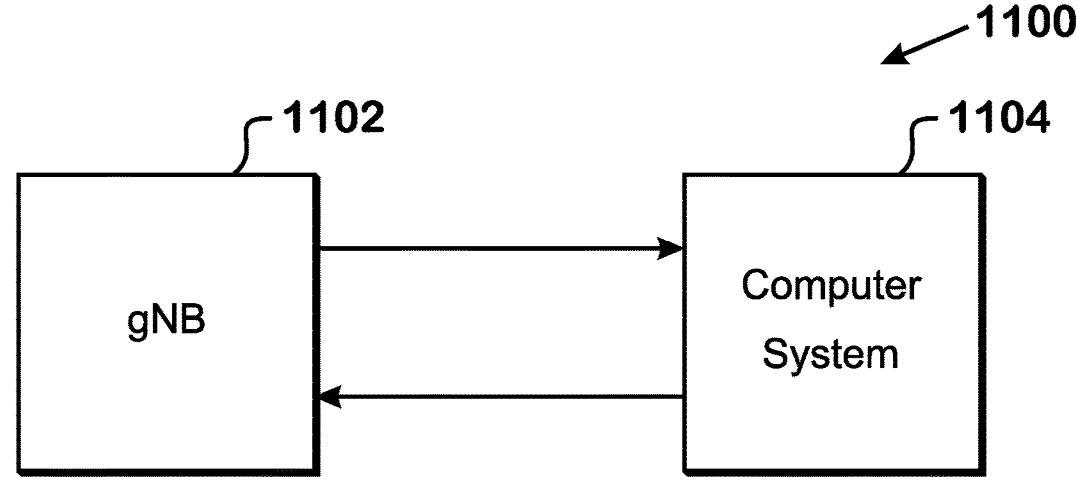
FIG. 11 shows a system for validating a software package.

FIG. 11 shows a system 1100 for validating a software package. The system 1100 includes a gNB 1102 and a computer system 1104. The gNB 1102 may be the gNB 114 described herein, and the computer system 1104 may be the computer system 202 described herein. The computer system 202 may receive data representing a plurality of pre-installation performance indicators respectively corresponding to a plurality of performance indicator types and data representing a plurality of post-installation performance indicators respectively corresponding to the plurality of performance indicator types as described herein. The computer system 202 may, for a performance indicator type of the plurality of performance indicator types, compare a respective post-installation performance indicator to a respective pre-installation performance indicator to determine a comparison result of a plurality of comparison results.

The computer system 202 may determine whether to validate the second software package based on the plurality of comparison results and in response to determining to validate the second software package, send a signal to the gNB 1102 indicating whether the second software package is validated for use when providing wireless coverage. The gNB 1102 may receive the signal and cause the second software package to be installed on the network entity or removed from the network entity. The computer system 202 may also receive data representing the indicators, configurations, parameters, alarms or a combination thereof and evaluate them for determining whether to validate the software package or change evaluation criteria. The computer system 202 may similarly send a signal to the gNB 1102 indicating whether the second software package is validated.

Figure 12:
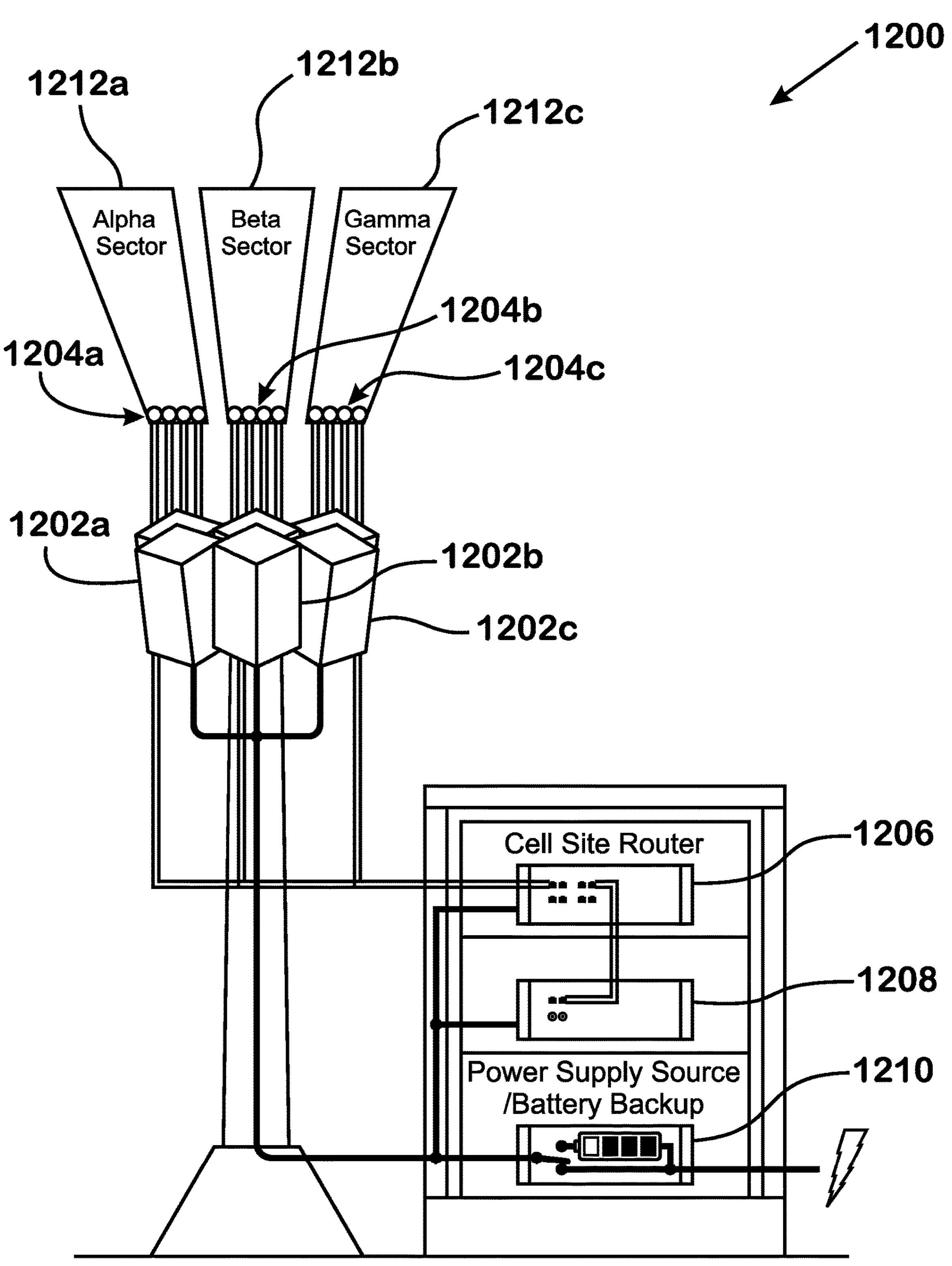
FIG. 12 shows a gNB in accordance with an embodiment.

FIG. 12 shows a gNB 1200 in accordance with an embodiment. The gNB 1200 includes a plurality of radio units including first, second and third radio units 1202*a*, 1202*b*, 1202*c*, a plurality of antenna groups including first, second and third antenna groups 1204*a*, 1204*b*, 1204*c*, a cell site router 1206, a distributed unit 1208 and a power supply source and battery backup 1210. The power supply source and battery backup 1210 may include a battery, a converter, a capacitor or a combination thereof.

The first, second and third antenna groups 1204*a*, 1204*b*, 1204*c* may each be an RF unit 112. The first, second and third antenna groups 1204*a*, 1204*b*, 1204*c* may each transmit and receive RF signals on a respective sector 1212*a*, 1212*b*, 1212*c* in a three-sector configuration. The first, second and third radio units 1202*a*, 1202*b*, 1202*c* may be coupled to the first, second and third antenna groups 1204*a*, 1204*b*, 1204*c*, respectively, using RF cables. The first, second and third radio units 1202*a*, 1202*b*, 1202*c* are coupled to the cell site router 1206. Each radio unit 1202*a*, 1202*b*, 1202*c* is coupled to the cell site router 1206 using a respective enhanced Common Public Radio Interface (eCPRI) connection. The cell site router 1206 is coupled to the distributed unit 1208 using a fiber optic connection. The radio units 1202*a*, 1202*b*, 1202*c*, cell site router 1206 and distributed unit 1208 are coupled to and powered by the power supply source and battery backup 1210.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:

a NodeB including a network entity; and a computer system including:

a processor; and memory having stored thereon executable instructions that, when executed by the processor, cause the processor to:

receive data representing a plurality of pre-installation performance indicators of a communication link between the NodeB and user equipment, the plurality of pre-installation performance indicators respectively corresponding to a plurality of performance indicator types, each pre-installation performance indicator of the plurality of pre-installation performance indicators being determined when the network entity is operated using a first software package;

receive data representing a plurality of post-installation performance indicators of the communication link between the NodeB and the user equipment, the plurality of post-installation performance indicators respectively corresponding to the plurality of performance indicator types, each post-installation performance indicator of the plurality of post-installation performance indicators being determined when the network entity is operated using a second software package;

for a performance indicator type of the plurality of performance indicator types, compare a respective post-installation performance indicator to a respective pre-installation performance indicator to determine a comparison result of a plurality of comparison results;

determine whether to validate the second software package based on the plurality of comparison results; and in response to determining to validate the second software package, send a signal indicating that the second software package is validated for use when providing wireless coverage.

2. The system of claim 1, wherein the executable instructions, when executed by the processor, cause the processor to select the plurality of performance indicator types from a list of performance indicator types including: an accessibility performance indicator, a mobility performance indicators, an uplink received signal strength indicator, a channel quality indicator, a rank indicator, a retainability, a data rate, a modulation and coding scheme, a power control and a Fifth Generation (5G) quality of service (QOS) identifier (5QI).

3. The system of claim 1, wherein the executable instructions, when executed by the processor, cause the processor to:

when the network entity has the first software package installed thereon, log the data representing the plurality of post-installation performance indicators during a first drive test; and when the network entity has the second software package installed thereon, log the data representing the plurality of pre-installation performance indicators during a second drive test.

4. The system of claim 1, wherein the executable instructions that, when executed by the processor, cause the processor to determine the comparison result of the plurality of comparison results cause the processor to:

determine whether the respective post-installation performance indicator has met a criterion by increasing in relation to the respective pre-installation performance indicator by more than a threshold.

5. The system of claim 1, wherein the executable instructions that, when executed by the processor, cause the processor to determine the comparison result of the plurality of comparison results cause the processor to:

determine whether the respective post-installation performance indicator has met a criterion by decreasing in relation to the respective pre-installation performance indicator by more than the threshold.

6. The system of claim 1, wherein the executable instructions that, when executed by the processor, cause the processor to determine whether to validate the second software package based on the plurality of comparison results cause the processor to:

aggregate the plurality of comparison results to determine a sum, wherein the comparison result of the plurality of comparison results is either set to a first value indicating that a criterion for the performance indicator type is met or set to a second value indicating that the criterion for the performance indicator type is not met;

compare the sum to a threshold; and determine whether to whether to validate the second software package based on whether the sum exceeds the threshold.

7. The system of claim 6, wherein the executable instructions that, when executed by the processor, cause the processor to determine whether to validate the second software package based on the plurality of comparison results cause the processor to:

before aggregating the plurality of comparison results, apply a plurality of weights to the plurality of comparison results, respectively.

8. The system of claim 1, wherein the executable instructions that, when executed by the processor, cause the processor to determine whether to validate the second software package based on the plurality of comparison results cause the processor to:

aggregate the plurality of comparison results to determine a sum, wherein the comparison result of the plurality of comparison results is either set to a first value indicating that a criterion for the performance indicator type is met or set to a second value indicating that the criterion for the performance indicator type is not met;

compare the sum to a threshold; and determine whether to whether to validate the second software package based on whether the sum is less than the threshold.

9. The system of claim 1, wherein:

the plurality of performance indicator types include a number of symbols allocated to the user equipment, and the executable instructions that, when executed by the processor, cause the processor to determine the comparison result for the number of symbols allocated to the user equipment cause the processor to:

determine whether a post-installation number of symbols allocated to the user equipment decreased in relation to a pre-installation number of symbols allocated to the user equipment by more than a threshold representing a number of symbols.

10. The system of claim 1, wherein:

the plurality of performance indicator types include a random access channel (RACH) detection threshold, and the executable instructions that, when executed by the processor, cause the processor to determine the comparison result for the RACH detection threshold cause the processor to:

determine whether a post-installation RACH detection threshold increased in relation to a pre-installation RACH detection threshold by more than a threshold representing a power level.

11. The system of claim 1, wherein the network entity is a central unit, a distributed unit or a radio unit.

12. The system of claim 1, wherein:

the executable instructions that, when executed by the processor, cause the processor to send the signal cause the processor to send an instruction to the NodeB to install the second software package, and the NodeB receives the instruction and causes the second software package to be installed on the network entity.

13. The system of claim 1, wherein in response to determining to invalidate the second software package, the NodeB reverts to using the first software package.

14. A method comprising:

receiving data representing a plurality of pre-installation performance indicators of a communication link between a base station and user equipment, the plurality of pre-installation performance indicators respectively corresponding to a plurality of performance indicator types, each pre-installation performance indicator of the plurality of pre-installation performance indicators being determined when a network entity of the base station is operated using a first software package;

receiving data representing a plurality of post-installation performance indicators of the communication link between the base station and the user equipment, the plurality of post-installation performance indicators respectively corresponding to the plurality of performance indicator types, each post-installation performance indicator of the plurality of post-installation performance indicators being determined when the network entity is operated using a second software package;

for a performance indicator type of the plurality of performance indicator types, comparing a respective post-installation performance indicator to a respective pre-installation performance indicator to determine a comparison result of a plurality of comparison results;

determining whether to validate the second software package based on the plurality of comparison results; and in response to determining to validate the second software package, sending a signal indicating that the second software package is validated for use when providing wireless coverage.

15. The method of claim 14, comprising:

selecting the plurality of performance indicator types from a list of performance indicator types including: an accessibility performance indicator, a mobility performance indicators, an uplink received signal strength indicator, a channel quality indicator, a rank indicator, a retainability, a data rate, a modulation and coding scheme, a power control and a Fifth Generation (5G) quality of service (QOS) identifier (5QI).

16. The method of claim 14, comprising:

when the network entity has the second software package installed thereon, logging the data representing the plurality of post-installation performance indicators during a first drive test; and when the network entity has the first software package installed thereon, logging the data representing the plurality of pre-installation performance indicators during a second drive test.

17. The method of claim 14, wherein determining the comparison result of the plurality of comparison results includes:

determining whether the respective post-installation performance indicator has met a criterion by increasing in relation to the respective pre-installation performance indicator by more than a threshold or decreasing in relation to the respective pre-installation performance indicator by more than the threshold.

18. A computer system, comprising:

a networking device;

a processor; and memory having stored thereon executable instructions that, when executed by the processor, cause the processor to:

receive data representing a plurality of pre-installation performance indicators of a communication link between a NodeB and user equipment, the plurality of pre-installation performance indicators respectively corresponding to a plurality of performance indicator types, each pre-installation performance indicator of the plurality of pre-installation performance indicators being determined when a network entity of the NodeB is operated using a first software package;

receive data representing a plurality of post-installation performance indicators of the communication link between the NodeB and the user equipment, the plurality of post-installation performance indicators respectively corresponding to the plurality of performance indicator types, each post-installation performance indicator of the plurality of post-installation performance indicators being determined when the network entity is operated using a second software package;

for a performance indicator type of the plurality of performance indicator types, compare a respective post-installation performance indicator to a respective pre-installation performance indicator to determine a comparison result of a plurality of comparison results;

determine whether to validate the second software package based on the plurality of comparison results; and in response to determining to validate the second software package, send a signal indicating that the second software package is validated for use when providing wireless coverage.

19. The computer system of claim 18, wherein the executable instructions, when executed by the processor, cause the processor to select the plurality of performance indicator types from a list of performance indicator types including: an accessibility performance indicator, a mobility performance indicators, an uplink received signal strength indicator, a channel quality indicator, a rank indicator, a retainability, a data rate, a modulation and coding scheme, a power control and a Fifth Generation (5G) quality of service (QOS) identifier (5QI).

20. The computer system of claim 19, wherein the executable instructions, when executed by the processor, cause the processor to log the data representing the plurality of post-installation performance indicators during a first drive test and when the network entity has the second software package installed thereon and log the data representing the plurality of pre-installation performance indicators during a second drive test and when the network entity has the first software package installed thereon.

* * * * *